United States Patent
Behera et al.

(10) Patent No.: US 12,079,088 B2
(45) Date of Patent: Sep. 3, 2024

(54) HYBRID TECHNIQUE TO PROTECT A REGISTRY

(71) Applicant: Dell Products L.P., Round Rock, TX (US)

(72) Inventors: Amarendra Behera, Bangalore (IN); Shelesh Chopra, Bangalore (IN); Tushar Dethe, Bangalore (IN); Roland Fernandes, Grimsby (CA); Sunil Yadav, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 17/842,289

(22) Filed: Jun. 16, 2022

(65) Prior Publication Data
US 2023/0409434 A1   Dec. 21, 2023

(51) Int. Cl.
*G06F 16/27*   (2019.01)
*G06F 11/14*   (2006.01)
*G06F 21/57*   (2013.01)

(52) U.S. Cl.
CPC ........ *G06F 11/1448* (2013.01); *G06F 21/575* (2013.01); *G06F 2221/033* (2013.01)

(58) Field of Classification Search
CPC .............. G06F 11/1448; G06F 21/575; G06F 2221/033
See application file for complete search history.

(56) References Cited

U.S. PATENT DOCUMENTS

| | | |
|---|---|---|
| 6,473,775 B1 | 10/2002 | Kusters |
| 7,418,619 B1 | 8/2008 | Uhlmann |
| 7,620,646 B1 | 11/2009 | Chai |
| 8,321,377 B2 | 11/2012 | Michael |
| 8,473,463 B1 | 6/2013 | Wilk |
| 8,838,528 B2 | 8/2014 | Atluri |
| 9,171,024 B1 | 10/2015 | Vaikar |
| 9,619,340 B1 | 4/2017 | Mirkhelkar |
| 9,805,068 B1 | 10/2017 | Sabjan |
| 9,846,621 B1 | 12/2017 | Mirkhelkar |
| 9,904,482 B1 | 2/2018 | Chakraborty |
| 10,146,629 B1 | 12/2018 | Yadav |
| 10,146,631 B1 | 12/2018 | Pradeep |

(Continued)

OTHER PUBLICATIONS

Winhelponline, How to Automatically Backup the Entire Registry in Windows, archived on Jan. 21, 2022, retrieved on Jan. 8, 2024, retrieved from the internet <URL: https://web.archive.org/web/20220121143116/https://www.winhelponline.com/blog/automatically-backup-registry-hives-windows-10/> (Year: 2022).*

(Continued)

*Primary Examiner* — Tyler J Torgrimson
(74) *Attorney, Agent, or Firm* — Staniford Tomita LLP

(57) ABSTRACT

A registry writer is instructed via a copy service on a host to prepare for generation of a snapshot. The registry writer is responsible for saving system hive files to disk before the snapshot is generated. A reporting of the system hive files is received from the registry writer. Communications are exchanged with an API exposed by an operating system of the host to identify user hive files. The system hive files reported by the registry writer and the user hive files identified using the API exposed by the operating system are backed up from the snapshot to secondary storage.

18 Claims, 25 Drawing Sheets

(56) References Cited

U.S. PATENT DOCUMENTS

| | | |
|---|---|---|
| 10,417,027 B1 | 9/2019 | Earl |
| 10,838,912 B1 | 11/2020 | Chopra |
| 11,327,850 B2 | 4/2022 | Enakiev |
| 11,513,921 B1 | 11/2022 | Yadav |
| 11,726,956 B1 * | 8/2023 | Khare ................. G06F 21/577 707/624 |
| 11,782,804 B1 | 9/2023 | Yadav |
| 11,868,622 B2 | 1/2024 | Prakashaiah |
| 2003/0028736 A1 | 2/2003 | Berkowitz |
| 2005/0091247 A1 | 4/2005 | Berkowitz |
| 2006/0053333 A1 | 3/2006 | Uhlmann |
| 2007/0006018 A1 | 1/2007 | Thompson |
| 2013/0061089 A1 | 3/2013 | Valiyaparambil |
| 2013/0166511 A1 | 6/2013 | Ghatty |
| 2015/0058837 A1 * | 2/2015 | Govindankutty ......... G06F 8/63 718/1 |
| 2018/0039547 A1 | 2/2018 | Madiraju |
| 2022/0398170 A1 | 12/2022 | Yadav |
| 2023/0342254 A1 | 10/2023 | Yadav |

OTHER PUBLICATIONS

Google Scholar/Patents search—text refined (Year: 2023).

* cited by examiner

HYBRID TECHNIQUE TO PROTECT A REGISTRY

CROSS-REFERENCE TO RELATED APPLICATIONS

The present application is related to U.S. patent application Ser. No. 17/842,559, filed Jun. 16, 2022; Ser. No. 17/842,438, filed Jun. 16, 2022; Ser. No. 17/842,387, filed Jun. 16, 2022; Ser. No. 17/842,338, filed Jun. 16, 2022; Ser. No. 17/842,608, filed Jun. 16, 2022; and Ser. No. 17/842,584, filed Jun. 16, 2022, all assigned to the assignee of the present application, and each incorporated herein by reference in its entirety.

TECHNICAL FIELD

Embodiments are generally directed to information processing, and more specifically to performing and recovering backups of system objects.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Organizations depend on having ready access to their data. Data, however, can be lost in a variety of ways such as through disasters and catastrophes (e.g., fires or flooding), media failures (e.g., disk crash), computer viruses, accidental deletion, and so forth. It is important that the data be backed up. An organization may have an immense amount of data that is critical to the organization's operation. Backing up data and subsequently recovering backed up data, however, can involve lengthy times and large amounts of computing resources such as network bandwidth, processing cycles, and storage due to the complexity and amount of data to be backed up.

Modern computer systems store a large amount of non-user generated data such as system data to support the functioning of the computer, users, and user applications. System data may include, for example, operating system files, registry database, directories, configuration settings, boot files, and the like.

Operating systems, such as the Windows® operating system as provided by Microsoft Corporation, provide some support for conducting backup of system data. For example, bare metal recovery (BMR) backups and system state recovery (SSR) backups are types of backups that seek to protect such system data. A system state backup involves the backing up of operating system files. A system state backup can allow for recovery when a machine starts, but the system files and registry have been lost. A bare metal backup includes a system state backup and other data such as boot volume and system volume that can allow a recovery to a new target machine when the original machine cannot be started or has otherwise been physically destroyed.

Nonetheless, support for such backups are limited. For example, backup features available for user data are not always available for system data. This is due, in part, to the greater complexities and interdependencies involved with system data and associated system services. For example, many backup products lack support for conducting incremental backups of BMR or SSR objects. An incremental backup is a type of backup that backs up changes since a last backup. The inability to perform an incremental BMR or SSR backup can lead to large increases in storage costs and backup time as each backup is required to be a full backup.

As another example, each new release of an operating system, such as Windows, can bring new features, but also additional challenges to pre-existing backup products seeking to protect the operating system and related extensions. A backup of system data may not necessarily include all system related components. Current backup products may miss certain system related components thus leaving a gap in protection.

There is need to be able to conduct bare metal restores in a secure manner. There is also a need to improve the user experience when performing BMR restores as current techniques require the user to recall and manually reconfigure numerous network settings in order to perform the restoration. As another example, existing backup products often cannot accurately report the sizes of system assets that are to be protected. Again, this is due to the greater complexities and interdependencies involved with system services and data as compared to user data.

There is a need for improved systems and techniques for conducting BMR and SSR backups and recovering from such backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
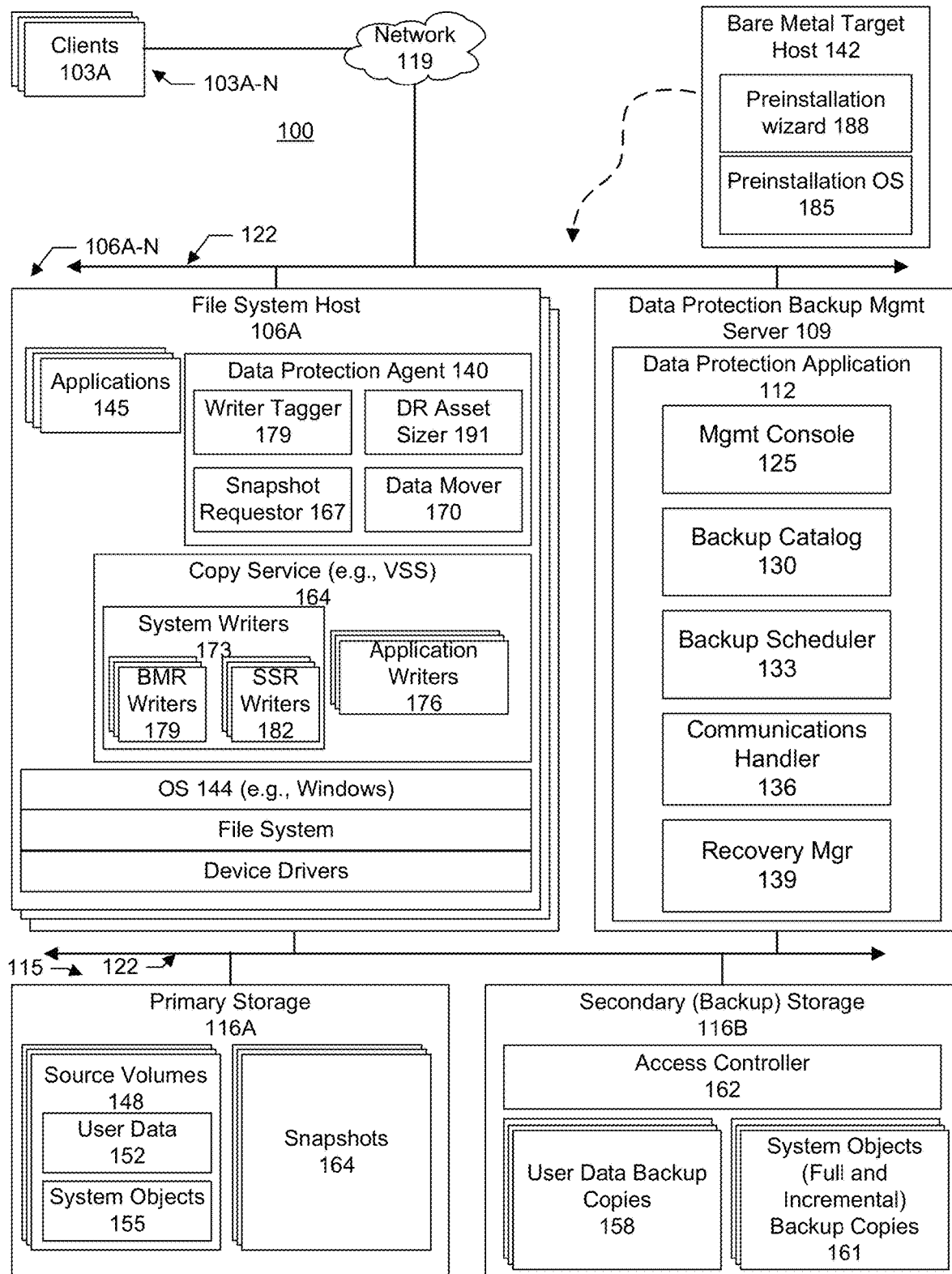
FIG. 1 shows a block diagram of a large-scale network implementing a data protection backup system, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a non-transitory computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. It should be appreciated that the blocks shown in the figures can be functional entities and there can be many different hardware and software configurations to implement the functions described. One or more individual blocks may exist as separate code modules. Alternatively, two or more blocks may be combined into a single code module. The various modules of the system may be implemented at any level such as at the application level, operating system level, and so forth. In this disclosure, the variable N and other similar index variables are assumed to be arbitrary positive integers greater than or equal to two.

Disclosed herein are methods and systems for conducting backups and recovery of system objects. Enterprises rely on backup and recovery software products to backup and recover data. It is important that backups be conducted on a regular basis so as to help ensure minimal disruption if the enterprise suffers a data loss event. Data can be lost through accidental deletion, system outage, hardware failure, malicious attack, or other catastrophic event. Generally, a backup involves copying and archiving the data, e.g., creating and saving a backup image to secondary or backup storage media, so that the data is available for restore should the primary copy of the data at the production site become lost or corrupted.

Some embodiments involve automated backup recovery techniques in a distributed system, such as a very large-scale wide area network (WAN), metropolitan area network (MAN), or cloud based network system. Those skilled in the art, however, will appreciate that embodiments are not limited thereto, and may include smaller-scale networks, such as local area networks (LANs). Thus, aspects of the one or more embodiments described herein may be implemented on one or more computers executing software instructions, and the computers may be networked in a client-server arrangement or similar distributed computer network.

FIG. 1 illustrates a computer network or information processing system 100 that implements one or more embodiments of a data protection backup system. The system includes a set of clients 103A-N, file system hosts 106A-N, a data protection backup management server 109 having a data protection application 112, and a storage system 115 including primary or production storage 116A and secondary or backup storage 116B. The hosts may be arranged into a cluster or other grouping of two or more interconnected computers running in parallel to support, for example, a distributed application, database, or file system. An example of a data protection backup system includes PowerProtect Data Manager (PPDM) as provided by Dell Technologies of Round Rock, Texas. PowerProtect Data Manager is a data protection application providing backup, restore, automated discovery, deduplication, and IT governance for physical, virtual, and cloud environments. While some specific embodiments are described in conjunction with PPDM, it should be appreciated that the described systems and techniques can be applied to other data protection backup systems.

A network 119 allows the clients to access the services and applications hosted by the hosts. The hosts may be general purpose computers or servers with hardware and software. The hosts may include, for example, a processor, memory, network interface card, local storage, applications, file system, operating system, and the like. The hosts and backup management server execute executable code (or computer-readable code) that embodies a technique or algorithm as described herein. An interconnect 122 connects the hosts and backup management server to the storage system. The interconnect may include a bus, a connection over a network such as a storage area network (SAN), local area network (LAN), or any other connection scheme to communicatively connect to the storage system.

The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data protection application includes a management console 125, backup catalog 130, backup scheduler 133, communications handler 136, and recovery manager 139. The management console provides a user interface to the data protection backup system that allows a user, such as a backup administrator, to schedule backups, define backup policies, add assets to be protected to the backup policies, identify data sources to be backed up, set retention durations, trigger on-demand backups, initiate recoveries, select recovery options, view status updates on backup and recovery operations, select a backup copy to restore, and configure other backup and recovery options and perform other administrative tasks.

In an embodiment, the host includes a Windows® operating system 144 and hosts any type of large or distributed application 145 such as Microsoft Exchange or SQL Server as provided by Microsoft Corporation of Redmond, Washington. Some specific embodiments are described in conjunction with the Windows® operating system and associated Windows® services, frameworks, and components. It should be appreciated, however, that the described aspects and principles are also applicable to other operating systems.

The application processes requests from the clients. Production data of the application is stored in primary storage. The backup management server is responsible for overall management of backups of the hosts from primary storage to secondary or backup storage by coordinating with backup components of the backup application that may be distributed across the hosts. The backups are secondary copies that can be used in the event that primary copies at the primary location become unavailable due to, for example, data corruption, accidental deletion, natural disaster, data breaches, hacks, or other data loss event. The backups may be stored in a format such as a compressed format, deduplicated format, or encrypted format that is different from the native source format. For example, in deduplicated storage, the storage system maintains metadata that allows two or more files to reference a same data block.

In particular, each host includes a data protection agent 140. The communications handler of the backup management server provides an interface (e.g., API) through which communications can be exchanged programmatically between the agent and backup management server. The agent coordinates and communicates with the backup management server to conduct backups and recoveries. For example, when a time for a backup has arrived, the backup management server or scheduler sends a command to the data protection agent at the host instructing the agent to conduct a backup of the host. Receipt of the command by the agent triggers a series of related operations to fulfill the backup (or recovery) request. For example, a backup operation may include an initial discovery process to determine the data objects, components, or files that should be included in the backup operation. While processing the request, the agent sends periodic updates concerning a status of the backup or recovery operation to the backup management server. The user can then view the progress via the management console.

The backup catalog provides an index of the data stored in secondary or backup storage. The catalog may include metadata associated with a backup such as a time and date of a backup, backup type (e.g., full backup, incremental backup, BMR backup, or SSR backup), identification of the backup source (e.g., file system host identifier), a manifest or other listing of components, files, volumes, or other assets included in a particular backup copy, information required for restoring or recovering a backup copy, and other metadata.

The recovery manager is responsible for managing the recovery of a particular backup copy to a particular target host. In an embodiment, the recovery may be a system state recovery (SSR). A system state recovery may be used when a host starts, but system files and registry information on the host has been lost. In another embodiment, the recovery may be a bare metal recovery (BMR). A bare metal recovery may be used when a host cannot start and recovery is to a bare metal target host 142. A bare metal recovery is a data recovery and restoration process where a computer is restored to a new target machine. The new target machine may include hardware similar to the original host being replaced, but may not have any installed software such as an operating system or applications. A bare metal recovery may be performed after the original host has suffered a catastrophic failure that necessitates the physical replacement of the host.

The storage system may include a pool of storage devices including storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage system may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage system may represent logical storage that includes any number of physical storage devices connected to form a logical storage.

The hosts include assets that are to be backed up. Assets include databases storing user data, file systems, mailboxes, and so forth. Assets, however, can also include system objects and data. For example, source volumes 148 of the hosts may include user data objects 152 and system objects 155.

User data refers to file system data or data that users create or generate. System objects refers to data related to the host operating system such as a system registry, active directory, boot files, and other related operating system extensions and objects. As such, backups to secondary or backup storage can include user data or file system backups 158 and system object backups 161. The secondary storage includes an access controller 162 that protects the backup copies from unauthorized access. That is, the access controller is responsible for authorizing credentials (e.g., user name and password) before allowing access to the backup copies stored at secondary storage.

In addition to backups of user data, it is also desirable to perform regular backups of system objects. For example, the Windows operating system includes a set of system services, directory services, system configuration, and other system data. These system services and data contain low-level settings for the operating system and provide support to the applications and users. For example, Active Directory (AD) is a directory service provided by Microsoft for Windows® domain networks.

The directory service includes a directory database in which objects tracked by the directory are stored. The objects can include user objects and groups. A group is a collection of other directory objects. Groups can be used to collect user accounts, computer accounts, and other groups into manageable units. Working with groups instead of with individual users helps simplify network maintenance and administration.

The objects are stored in a hierarchical data structure or tree. Other examples of objects that may be tracked by the directory service include printers and network devices. Each object includes a set of attributes storing descriptive information about a respective object. The user objects correspond to or represent the users of the organization. Group objects represent groups that a user may be a member of.

When, for example, a user attempts to log into a computer that is part of a domain managed by the directory service, a domain controller of the directory service can check the login credentials of the user to determine whether the user should be allowed to log into the network and, if so, the security policies that should attach to the user as defined in the attributes associated with a user object representing the user. For example, some users may be allowed to install or update software. Other users may be blocked from installing or updating software.

A directory service may include a user interface through which a network administrator can create and manage domains, users, and objects within a network. For example, when a new employee joins an organization, the network administrator may create in the directory a new user object representing the new employee. User rights and permissions may be attached as attributes to the new user object in order to limit or control the new employee's access to the network and other computers or devices connected to the network. Specifically, the network administrator may create a user account within the directory service that allows the new employee to log in to the organization's network and sign in to a computer (e.g., laptop or desktop) given or assigned to the new employee by the organization.

When an employee leaves the organization, the network administrator may delete, remove, or otherwise update a user object from the directory representing the employee so that the now former employee will not be able to log in to the network. When an employee moves to a different department within the organization, the network administrator may update in the directory attributes associated with a user object representing the employee to reflect a new set of rights or permissions that the employee may now have. In a Windows operating system, the Ntds.dit file is a database that stores active directory data.

Another example of a system object includes a registry. The Windows registry is a collection of databases of configuration settings for Microsoft Windows operating systems. The registry is a hierarchical database that stores low-level settings for the Microsoft Windows® operating system. The registry contains information, settings, options, and other values for installed programs and hardware. The registry has a structure similar to Windows® folders and files. Each main folder is named as a hive. Each hive contains sub folders called keys. These keys contain subkeys with configuration values. Whenever a software program, a hardware or a device driver for a newly connected hardware in a Windows®-based computer system is installed, the initial configuration settings of these are stored as keys and values in a system-defined, central hierarchical database repository called the registry or Windows® registry. During the usage of the software or the hardware, the changes made to these configurations are updated in the registry.

Another example of a system object includes boot files. When the Windows® OS is installed, certain files are placed on the host hard drive that are required to be present for the operating system to load. The boot files facilitate the locating, loading, and initializing of the operating system during the boot sequence.

System object backups may include bare metal recovery (BMR) backups and system state recovery (SSR) backups. In an embodiment, BMR refers to a disaster recovery plan which provides protection when a machine will not start thereby requiring everything to be recovered. Failure of the machine to start may be due to any reason such as hardware failure, cyber-attacks and many more. A BMR includes backing up operating system files and all data except user data on critical volumes. Critical volumes includes the boot volume, system volume, and any volume hosting system state data such as active directory (AD) and application services. Thus, critical volumes are volumes containing files for installed Windows services, installed applications (e.g., SQL Server), and the like. A BMR backup includes a system state backup. That is, an SSR backup is a subset of a BMR backup. Generally, a BMR backup may have a size of about 30 gigabytes (GB). It is estimated that 90 percent of business without a disaster recovery plan will fail after a disaster. Other user cases of BMR include conversion of physical to virtual (P2V), virtual to physical (V2P), and virtual to virtual (V2V).

In an embodiment, SSR refers to a recovery plan which enables recovery when a machine starts but system files and registry information have been lost. A system state backup may include one or more of a domain member including boot files, COM+ class registration database, registry, Internet Information Services (IIS) metadata, and the like; domain controller including Active Directory (NTDS), boot files, COM+ class registration database, registry, system volume (SYSVOL); a machine running cluster services including backing up cluster server metadata; or a machine running certificate services including backing up certificate data. Generally, an SSR backup may range from about 8 GB to about 12 GB in size. A system state recovery may be used to restore a machine to a point in time when some applications were, for example, upgraded, installed, uninstalled, patched/security upgraded, and the like. A system state recovery may be used to restore a machine to a previous state when, for example, some applications have stopped working or have started behaving unexpectedly after upgrade or some system state components have become corrupted.

Having a system backup, such as a BMR backup copy or SSR backup copy, can allow a host to be quickly recovered. For example, a BMR/SSR backup copy can help eliminate or reduce the need to reinstall individual pieces of system software, patches, components, and manually reconfigure system settings.

There can be two types of system data or system object backups including BMR backups and SSR backups. System backups (e.g., BMR backups, SSR backups, or both) may be conducted independent of user data backups. In an embodiment, a system backup is a backup of system data that excludes, omits, or skips user data. That is, a BMR/SSR backup may exclude user generated data such as files and folders containing user generated content.

BMR/SSR backups may be conducted according to a first backup schedule while user data backups are conducted according to a second backup schedule, different from the first backup schedule. BMR/SSR backups may be conducted at a first frequency while user data backups are conducted at a second frequency, different from the first frequency. For example, user data backups may be conducted daily while BMR/SSR backups may be conducted weekly, once every 15 days, or any other frequency as desired. BMR/SSR backups may be conducted less frequently than user data backups as user data may be expected to change more frequently as compared to system data. BMR backups and SSR backups may be conducted independently of each other. If a BMR/SSR backup happens to run concurrently with a user data backup, priority may be given to the user data backup. BMR/SSR backups involve backing up logical assets such as portions of various volumes that include system data.

In an embodiment, a default system backup includes a BMR backup. For example, a backup policy may specify BMR backups. Systems and techniques are provided to recover portions of a BMR backup. For example, a user may recover just SSR components from a BMR backup. This allows for fast recoveries in cases where it is not necessary to recover an entire BMR backup. In other cases, a user may create a backup policy for SSR backups and another backup policy for BMR backups. Systems and techniques allow for granular control over whether to conduct a BMR backup or an SSR backup.

To facilitate backups, a backup application may rely on snapshots 164 to conduct backups of data from the source volumes to backup storage. A snapshot includes a set of reference markers or pointers to data on a storage device (e.g., disk drive, disk array, storage array, or storage area network (SAN)). Snapshots are instantaneous or near-instantaneous virtual copies of a volume capturing the data or state of the volume as it appeared at a time the snapshot was taken.

Figure 2:
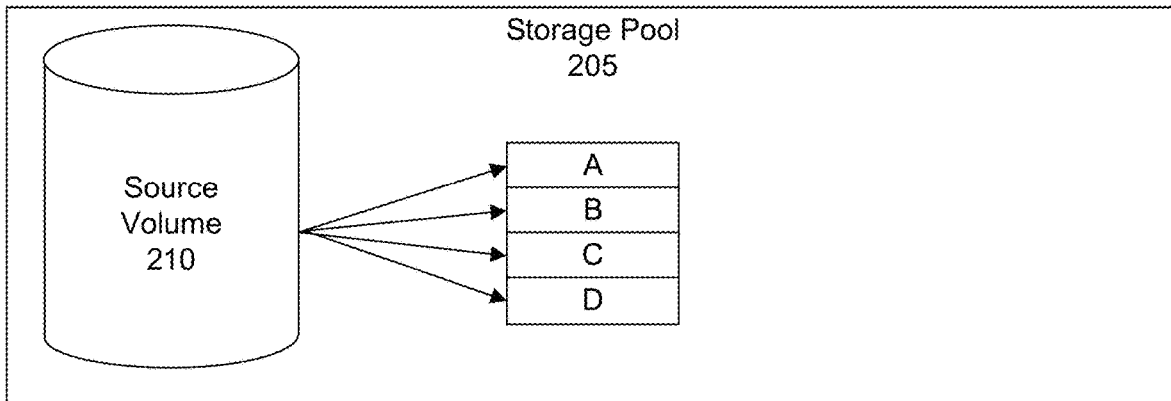
FIG. 2 shows a block diagram of a storage pool having a source volume, according to one or more embodiments.
Figure 3:
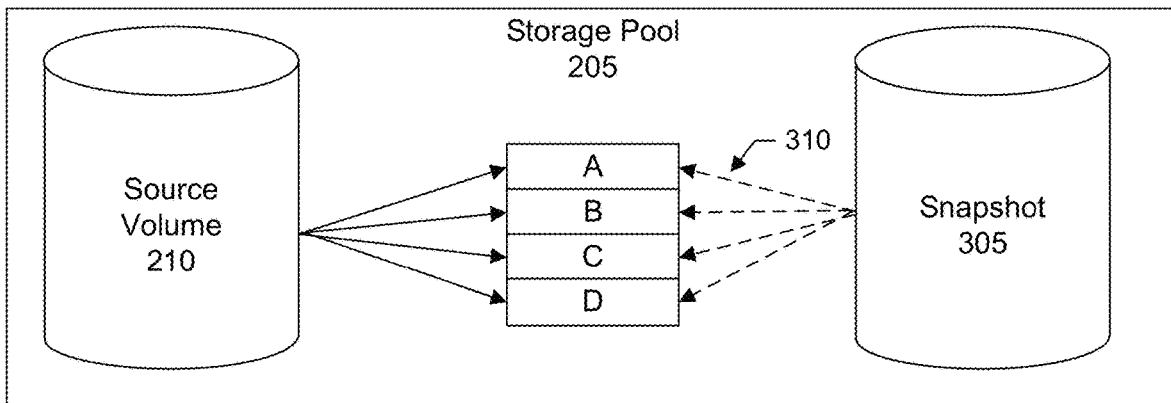
FIG. 3 shows a block diagram of a snapshot having been taken of the source volume, according to one or more embodiments.
Figure 4:
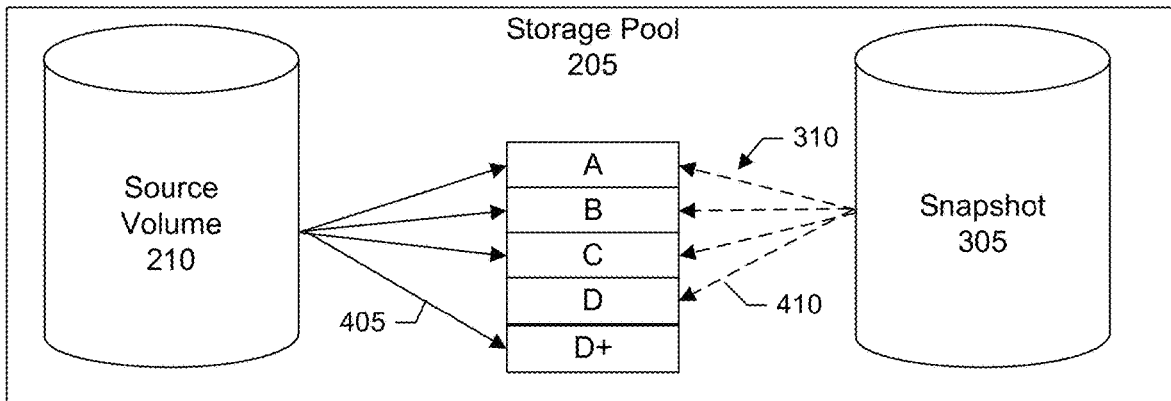
FIG. 4 shows a block diagram of an operation of the snapshot, according to one or more embodiments.

There are many different ways to create a snapshot. For example, FIGS. 2-4 show examples of a redirect-on-write (ROW) snapshot operation. With redirect-on-write, new writes to snapped storage resources or their snapshots are redirected to a new location in the same storage pool, and pointers are updated to point to the new location. Specifically, FIG. 2 shows a first state of a storage pool 205 having a source volume 210 with data blocks A-D. FIG. 3 shows a second state, after the first state, of the storage pool in which a snapshot 305 has been taken of the volume. The snapshot includes pointers 310 to blocks A-D. FIG. 4 shows a third state, after the second state, of the storage pool when a write has been issued by a host that attempts to overwrite block D with new data, e.g., D+. As shown in the example of FIG. 4, new data D+ is written to a new location in the same storage pool and a pointer 405 of the source volume is updated to point to block D+. The snapshot, however, continues to point 410 to original block D thereby preserving the original data.

Another example of a snapshot technique is copy-on-write (COW). In order to preserve the snapped data, copy-on-write snapshots copy blocks to a designated protection space or storage area prior to being overwritten.

Snapshots allow backups to be conducted with little interruption to operations of the host. Snapshots can be created very quickly because they are virtual rather than actual copies of data. For example, the time required to create or take a snapshot can be on the order of about 10 seconds. Once a snapshot has been taken of a source volume a host can resume production operations (e.g., writes) to the source volume as the snapshot will preserve the data or state of the volume as of the time of the snapshot. Data from the snapshot can then be rolled over to the secondary or backup storage system. Specifically, the host or a backup proxy mounts and reads the snapshot to copy the actual data blocks of the source volume to secondary storage while the host continues to make production writes to the source volume.

Referring back now to FIG. 1, in an embodiment, backups are performed in conjunction with a copy service 164. The copy service may be referred to as a volume snapshot service or shadow copy service. When a determination or request is received to make a backup, a snapshot requestor 167 of the backup agent communicates with the copy service to request a snapshot. In an embodiment, the copy service is the Microsoft Volume Shadow Copy Service (VSS) as provided by Microsoft Corporation. Copy services such as VSS facilitate the creation of a snapshot of a volume. A snapshot of a volume may be referred to as a point-in-time copy, shadow copy, or virtual volume. Once a snapshot has been created, a data mover 170 of the backup agent can copy data from the snapshot to backup storage in a process referred to as a rollover and thus create a backup image of the volume.

The VSS framework includes a set of component object model (COM) application programming interfaces (APIs) that provide standardized interfaces for third-party backup and restoration products to centrally manage the backup and restore operations on a variety of applications. VSS allows volume backups to be performed while applications and system services on a production host continue to write to the source volume. Generally, VSS includes three components including a requestor, provider, and writer. The requestor refers to the application that requests the creation of a shadow copy, e.g., snapshot. The provider refers to the interface that provides the functionality to actually make the shadow copy. The writer is the application-specific software that acts to ensure that application data is ready for shadow copy creation.

Requestors, providers, and writers communicate in the VSS framework to create and restore volume shadow copies. A shadow copy of a volume "duplicates" all the data held on that volume at a particular point in time. In an embodiment, a requestor initiates the backup and restore processes by communicating as such with the copy service. The copy service, in turn, instructs a writer to prepare their dataset for backup. The preparation may include, for example, completing open transactions, rolling back transaction logs, and flushing caches. When everything is ready, the requestor via the copy service instructs a provider to create a shadow copy. A requester can be any application, such as a backup application (or backup agent), that uses the VSS API to request the services of the copy service to create and manage shadow copies and shadow copy sets of one or more volumes. In other words, in addition to initiating shadow copies, the backup application communicates with writers via the copy service to gather information on the production host and to signal writers to prepare their data for backup. A writer helps to guarantee consistency of components (e.g., files) that the writer is responsible for and identify or enumerate those components for backup.

The copy service, e.g., VSS, helps to provide a consistent image of a dataset to ensure a logically consistent backup. For example, in many cases, it would be desirable to perform a backup while the production host remains available (e.g., while there may be open files that are being written to) in order to reduce or minimize the amount of downtime. Modifying data while a backup job is running, however, can result in a corrupted backup. The VSS copy service helps to ensure, among other things, that a VSS-enabled application (e.g., Exchange, SQL Server, or Windows Registry) is properly quiesced or brought to a consistent state in order to create a snapshot.

In an embodiment, the copy service includes two types of writers including system writers 173 and application writers 176. The writers help to ensure logically-consistent open file backups. There may be a writer for each application to be backed up. For example, there may be an Exchange Writer, SQL Server Writer, Registry Writer, and so forth. Each writer is aware of where its corresponding application stores its data. More specifically, a writer may be responsible for functions such as quiescing the corresponding application and data stores to be backed up (e.g., temporarily freezing application I/O write requests) and flushing the cache for snapshot generation, and thawing the application and data stores after the snapshot is generated. A writer may further create or facilitate the creation of a description of the backup components, a data restoration process, or both. The information can be used by the backup application to determine how to backup and restore or recover the data.

System writers are responsible for handling system state including, for example, operating system files, registry, and related extensions. The system writers help to ensure that system files are saved to disk before generation of the snapshot. There are different types or subtypes of system writers including BMR writers 179 and SSR writers 182. In various embodiments, systems and techniques are provided for incremental backup of BMR objects and SSR objects; automatic discovery of a BMR object; single BMR backups (includes both BMR and SSR); single policy for Windows machine protection (file system and disaster recovery (DR)) with prioritization of assets; individual system state component recoveries; automatic discoveries of BMR backup copies; and intuitive and flexible user interfaces.

VSS does not provide support for incremental BMR or SSR backups. As a result, BMR/SSR backups are inefficient as each BMR or SSR backup may include redundant data and require additional time to complete. In various embodiments, systems and techniques are provided to overcome the limitations of the VSS framework to support incremental backups for BMR and SSR; logically group the objects to be protected for BMR and SSR; discover BMR objects as assets; leverage, by the file system agent, the existing framework to enable BMR and SSR backups; and facilitate, by the file system agent, SSR backups, and leverage existing centralized file level restore (CFLR) and extend it for SRR.

Figure 5:
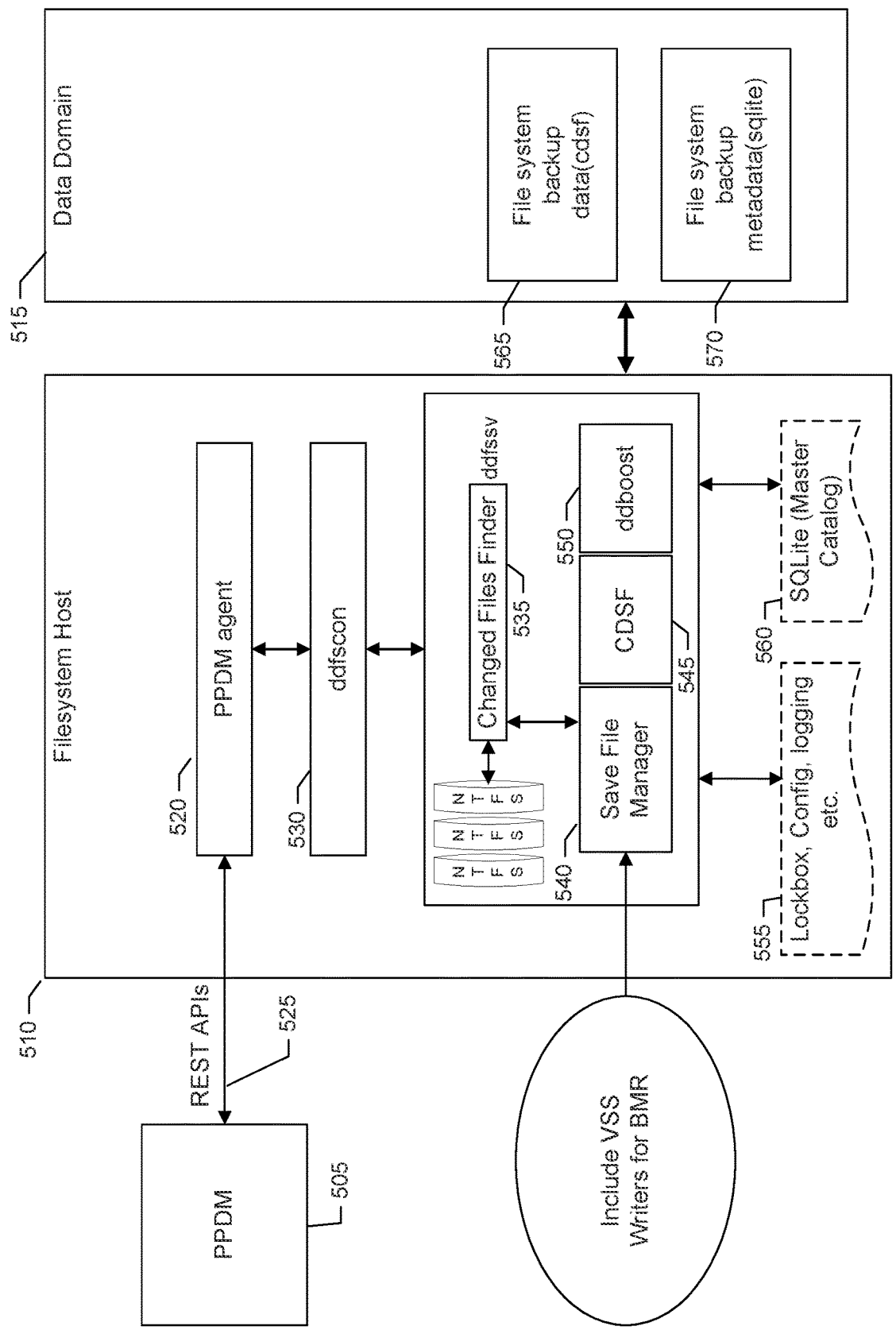
FIG. 5 shows an architecture of a data protection backup system, according to one or more embodiments.

FIG. 5 shows an architecture of a specific embodiment of the data protection backup system. In the example shown in FIG. 5, the backup system is PowerProtect Data Manager as provided by Dell Technologies. This system includes a PPDM server 505, file system host 510, and Data Domain storage system 515. Installed on the host is a PPDM agent 520. The agent includes an agent service that communicates 525 with the PPDM server via representational state transfer (REST) application programming interfaces (APIs). The host further includes a component 530, referred to as ddfscon, changed files finder component 535, save file manager component 540 including VSS writers for conducting BMR backups, backup formatter 545, and ddboost library 550.

Component 530 (ddfscon) is responsible for asset discovery on the host. The save file manager component works in conjunction with the VSS writers and framework to take a snapshot of the system and copy the data to the Data Domain storage system.

In particular, a backup is initiated by PPDM sending a request to the PPDM agent. The agent includes a service that is responsible for responding to the backup (and restoration) requests from the PPDM server. The agent, upon receiving the requests, invokes a series of other components (e.g., ddfscon) to process the request. For example, the changed files finder component finds which files have changed since a last backup. The save file management component writes the data to the Data Domain storage system. In an embodiment, the data is written in a particular format referred to as common data streaming format (CDSF).

DDboost is a system that distributes parts of the deduplication process to the application client hosts, enabling client-side deduplication for faster, more efficient backup and recovery. The client hosts may use the ddboost backup protocol to conduct backups of data to the backup storage system, restore the backups from the storage system to the client hosts, or perform other data protection operations. The ddboost library exposes application programming interfaces (APIs) to integrate with a Data Domain system using an optimized transport mechanism. These API interfaces exported by the ddboost library provide mechanisms to access or manipulate the functionality of a Data Domain file system. Embodiments may utilize the ddboost file system plug-in (BoostFS), which resides on the application host file system and presents a standard file system mount point to the application. With direct access to a BoostFS mount point, the application can leverage the storage and network efficiencies of the DDBoost protocol for backup and recovery.

A box 555 identifies a lockbox, configuration file, and logging files associated with the PPDM agent. The lock box stores credentials (e.g., username and password) required to access the backup storage system (e.g., Data Domain). The configuration file stores configuration options associated with conducting backup and restore operations. The log files record events that occur during the backup and restoration operations.

A box 560 identifies metadata that is generated during the backups. The metadata tracks information about the backups to enable cataloging and recovery. For example, a backup of a particular file includes generating corresponding metadata for the file such as its location (e.g., starting offset) so that it can later be located and recovered. The metadata information may be stored in a SQLite database. Thus, the storage system includes both actual data 565 and corresponding metadata 570 tracking the actual data to allow reconstruction.

Figure 6:
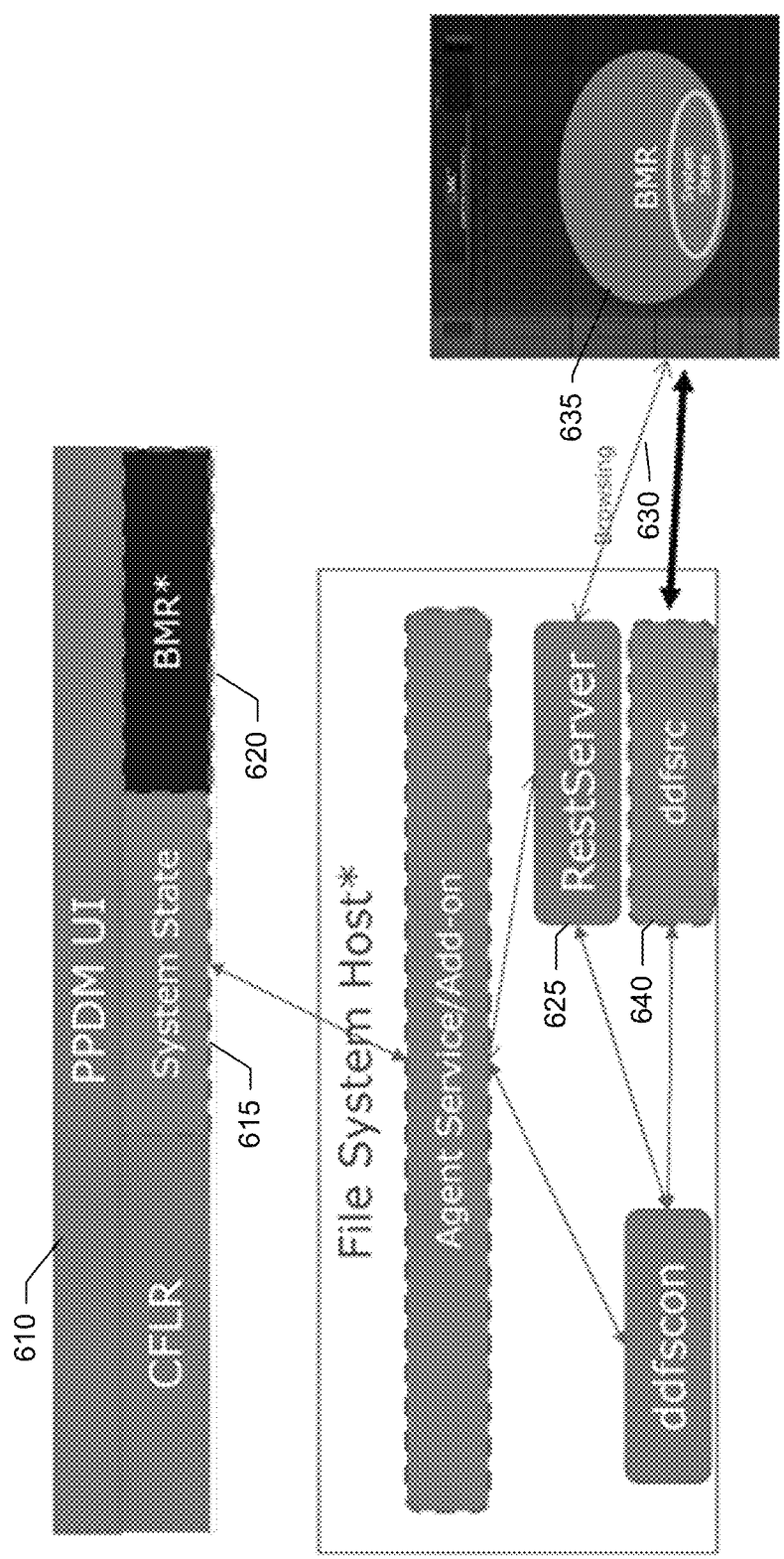
FIG. 6 shows another block diagram of interactions among components of a data protection backup system, according to one or more embodiments.

FIG. 6 shows another block diagram of the file system host shown in FIG. 5. The example shown in FIG. 6 illustrate the communication flows involved with restoring the host. In particular, a PPDM user interface (UI) 610 includes user selectable options for system state recovery 615 and BMR recoveries 620. An agent service 622 at the host is responsible for communications such as with the PPDM server (e.g., backup management server). For example, when the PPDM server sends a request for a backup or restore, the request is received by the agent service which, in turn, invokes other components as required to conduct discovery, conduct the backup (or restore), identify changed files, write backup data according to a particular format to the storage system, and so forth. A RestServer 625 may be established at the host to serve as an interface through which communications with the backup storage are sent and received. In particular, the user can browse 630 a listing of BMR and SSR backup copies 635 that are available at the backup storage system. The RestServer enables the browsing of backup copies available for recovery.

For example, the user can view what components (e.g., registry writer and other writers) are included in a particular BMR or SSR backup copy. Upon selecting a particular backup copy (or components within the particular backup copy), a process 640 (ddfsrc) is triggered to handle the recovery of the selected components from the storage system to the host.

Referring back now to FIG. 1, in an embodiment, the agent includes a writer tagger 179. The tagger is responsible for discovering writers, marking writers, and promoting writers. These actions facilitate, among other things, incremental BMR and SSR backups.

As discussed, current backup products and the VSS framework do not provide direct support for incremental BMR or SSR backups. In an embodiment, a technique to allow incremental BMR or SSR backups includes using file properties to identify the files changed for writers to support incremental backup. Some writers, however, do not change file properties even after underlying data is changed. In an embodiment, the writers are identified and a full backup is taken for them. This allows support for BMR and SSR incremental backups.

During the BMR/SSR asset discovery, an agent conducts a very deep level object scanning to identify parts of BMR/SSR backups. Based on the type of each part, these parts are tagged and this information is saved as part of backup metadata. This helps in performing incremental backups and individual part recoveries.

Figure 7:
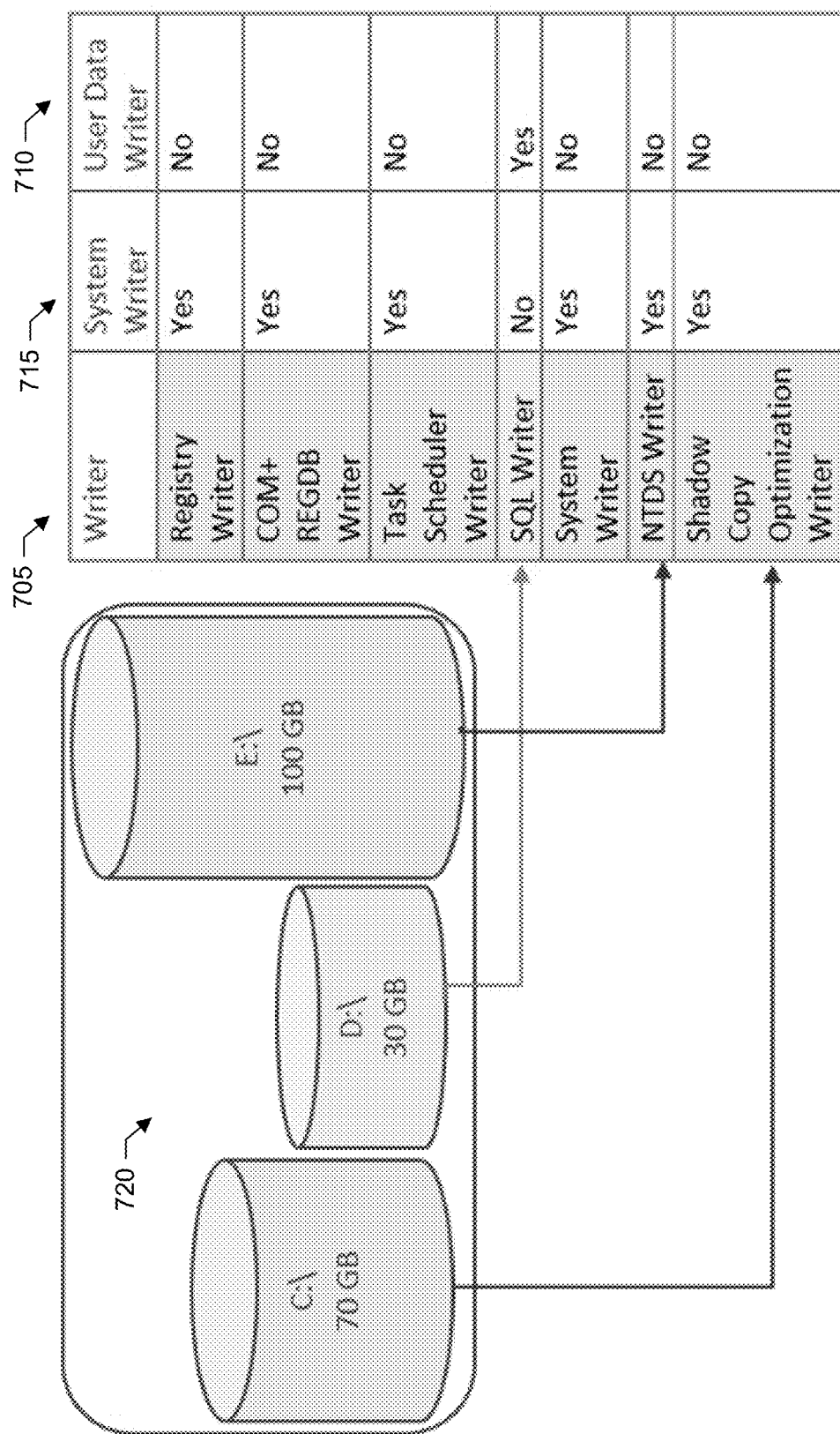
FIG. 7 shows an example of listing and identifying writers of a copy service, according to one or more embodiments.

FIG. 7 shows a graphical representation of the backup metadata that may be generated when tagging writers during BMR asset discovery for post processing. In an embodiment, the data protection agent communicates with the copy service framework (e.g., VSS) to obtain a list of writers 705 associated with the copy service. For each writer, the agent determines whether the writer is a user data writer (e.g., application writer) 710 or system writer 715. This information is stored along with an identification 720 of the drive or volume that the writer points to or is associated with.

Figure 8:
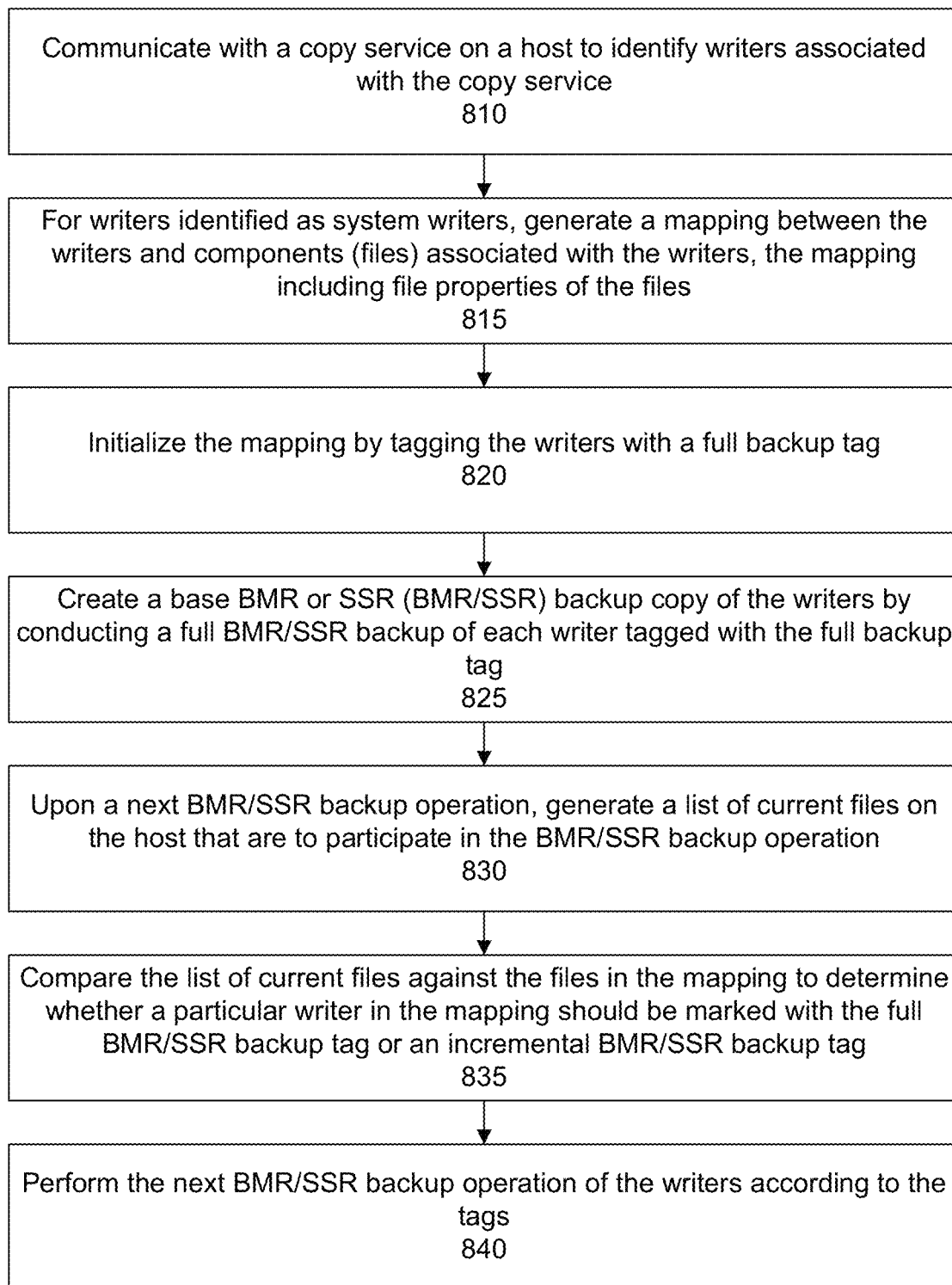
FIG. 8 shows a flow for tagging writers during BMR asset discovery for post processing including conducting incremental backups, according to one or more embodiments.

FIG. 8 shows a flow for conducting an incremental BMR or SSR backup of a host. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

Generally, there are three types of backup including a full backup, incremental backup, and differential backup. A full backup is a backup of all the content. This is a bulky backup and consumes a substantial amount of storage space. An incremental backup is a backup of the changed data only. An incremental backup helps to provide optimization of storage space. A differential backup is a backup of all the files that have changed since the last full backup was performed. A differential backup also helps to provide optimization of storage space and can facilitate quick recoveries.

In Windows systems (e.g., systems utilizing the Windows operating system), data protection is facilitated using the VSS framework. BMR/SSR protection uses VSS to protect the system state. The VSS framework, however, supports only full backup for BMR/SSR.

There is a need to overcome this Microsoft limitation and support an incremental backup feature for BMR/SSR. Conventional techniques for incremental backups use the file date modified property under the assumption that if there is a change in data the file date modified will change. But it has been observed for some writers that even after the underlying data is changed the date modified property was not changed. Thus, the file date modified property logic cannot be relied upon. Instead, in an embodiment, a multiple step technique is provided to reliably perform an incremental BMR or SSR backup. This embodiment includes a two-step approach for protection. There is a first step including an asset discovery stage and a second stage including the backup stage.

More particularly, in a step 810, a data protection agent on a host communicates with a copy service, e.g., VSS, on the host to identify writers associated with the copy service.

In a step 815, for writers identified as system writers, a mapping is generated between the writers and components (e.g., files) associated with the writers. The mapping includes file properties of the files. The file properties include a size of the file and timestamps indicating a time and date when the file was last modified. In an embodiment, the mapping is stored in a file referred to as "Master.rec."

In a step 820, the mapping is initialized by tagging or marking the writers with a full backup tag. For example, there can be a database or data structure having a field listing the writers and another field storing backup tag details (e.g., full or incremental).

In a step 825, a base BMR or SRR backup copy of the writers is created by conducting a full BMR or SSR backup of each writer tagged with the full backup tag. In other words, all files associated with a writer having the full backup tag are backed up.

In a step 830, upon a next BMR or SSR backup, a list of current files on the host that are to participate in the BMR or SSR backup operation is generated. In an embodiment, the agent communicates with the copy service (e.g., VSS) to instruct the writers to enumerate the files used for the BMR or SSR backup.

In a step 835, the list of current files is compared against the files in the mapping to determine whether a particular writer in the mapping should be marked with the full BMR/SSR backup tag or an incremental BMR/SSR backup tag.

In a step 840, the next BMR/SSR backup operation of the writers is performed according to the tags. For example, backing up a writer marked with a full backup tag may include backing up all files that the writer is responsible for. Backing up a writer marked with an incremental tag may include backing up at most a portion of files that the writer is responsible for (e.g., files that have changed since a last backup).

Figure 9:
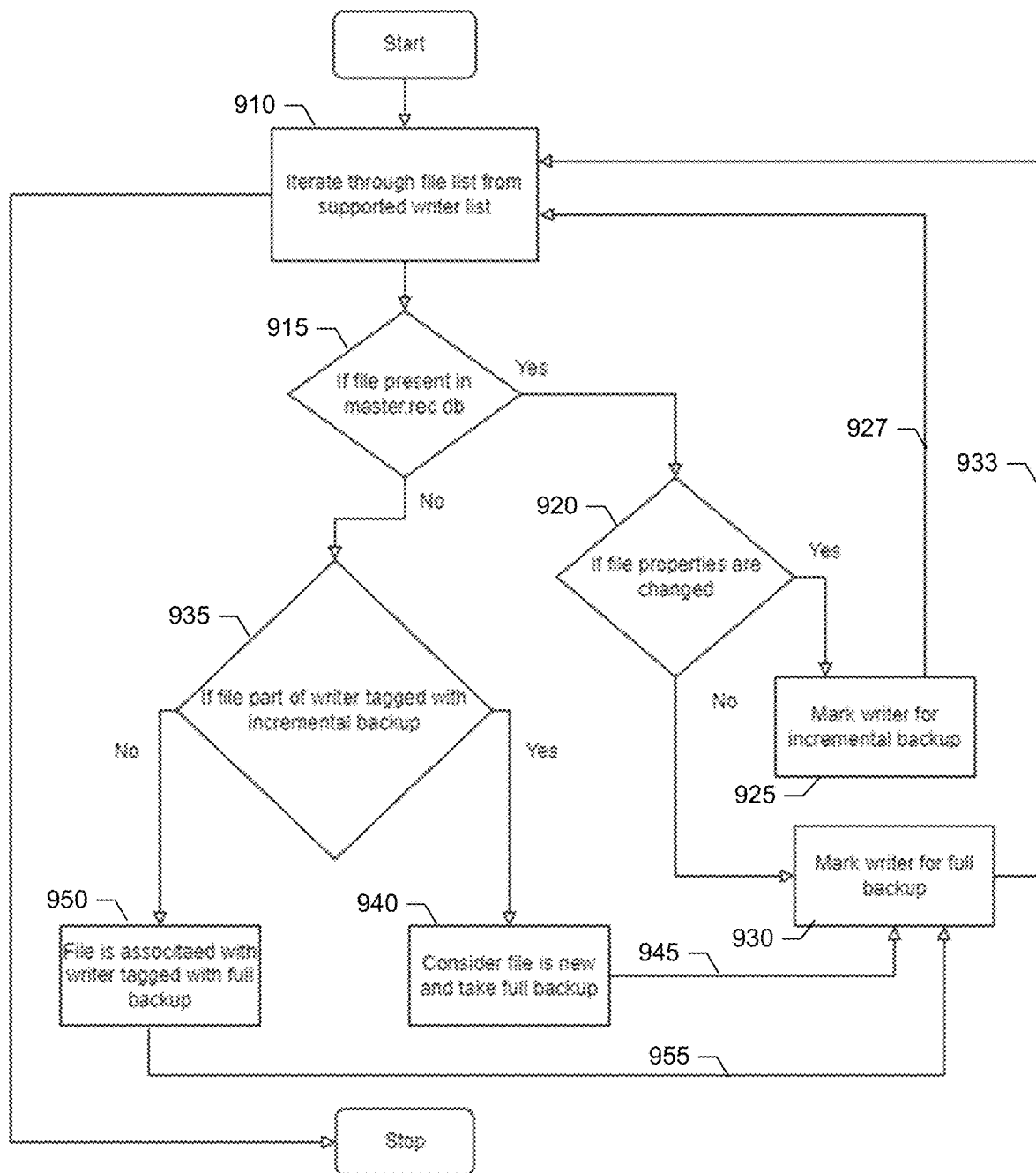
FIG. 9 shows another flow for tagging writers to support incremental backups of system objects, according to one or more embodiments.

FIG. 9 shows further detail of a flow for determining whether a writer should be marked with the full backup tag or the incremental backup tag. During BMR/SSR asset discovery operation, writers that will participate in BMR/SSR backup operation are identified. Once these writers and their components are identified, a mapping of a writer and its files is created and saved on the system in a mapping file (e.g., Master.rec database). This Master.rec database file includes the file name, file path and its properties including the timestamp of file.

During the subsequent host operation (e.g., asset discovery/backup), the list of files that will participate in the backup operation is generated. This list is compared with the files present in Master.rec. If the file is present in Master.rec, the file properties of the file as provided in Master.rec is compared with the file properties of the file as provided in the list of files that are to participate in the backup operation.

If there is a change in file properties, such as a change in the size, timestamp, or other property, the writer associated with the file is tagged or marked for an incremental backup If there is no change in file properties, such as no change in the size, timestamp, or other property, the writer associated with the file is tagged for a full backup. As discussed, a writer may not necessarily change, for example, the date modified property of an associated file even if the file data has changed. Thus, marking the writer for a full backup helps to ensure that no changed files are excluded from the backup.

If the file is not present in Master.rec, there can be two scenarios, based on the writer tag (e.g., full or incremental). In particular, if the file that is associated with a writer is tagged with incremental, the file is considered as a new file and a full backup is taken of the file. If the file that is associated with the writer that is tagged with full, a full backup is taken of the writer.

Specifically, in a step 910, the data protection agent iterates through a file list from a supported writers list. In an embodiment, the file list includes a listing of files associated with writers as reported by the copy service for a current backup operation. In an embodiment, the writers are system writers. The agent communicates with the copy service to identify the writers. For each writer identified as a system writer, the agent communicates with the copy service to identify the files associated with the system writer.

In a step 915, a determination is made as to whether a file in the list of files is present in the master.rec database. If the file is present in the master.rec database, a determination is made as to whether properties of the file as recorded in the master.rec database have changed based on the properties as reported in the list of files (step 920).

If the file properties have changed, in a step 925, a writer associated with the file is marked for an incremental backup. The incremental backup tag on the writer indicates to a backup process that only a subset of files associated with the writer are to be backed up such as the file having the changed properties. Other files associated with the writer not having had any changes in file properties are to be excluded from the current backup. The iteration process loops back 927 to select a next file to examine. The iteration process continues or repeats until each file has been examined.

If the file properties have not changed, in a step 930, the writer associated with the file is marked for a full backup. The full backup tag on the writer indicates to the backup process that all files associated with the writer are to be backed up. This helps to ensure that any changes to the files are included in the current backup even if the associated writer does not update the file properties. The iteration process loops back 933 to select a next file to examine.

If, however, the file is not present in the master.rec database, in a step 935, a determination is made as to whether the file is a part of or is associated with a writer tagged with the incremental backup tag.

If the file is associated with a writer tagged with the incremental backup tag, the file is considered as a new file and a full backup is taken (step 940). In particular, as shown by an arrow 945, the writer is marked for a full backup (step 930). In other words, as each file in the file list is iterated through, a writer initially marked with the incremental backup tag may have the tag replaced with the full backup tag. This may occur when, for example, a new file associated with the writer has been added after the base BMR or SSR backup copy has been created.

In a step 950, if the file is not associated with a writer tagged with the incremental backup tag, the file will then be associated with a writer tagged with the full backup tag. As shown by an arrow 955, the writer is marked for a full backup (step 930). Again, a full backup of the writer includes backing up all files associated with the writer thereby helping to ensure that any file changes (even if not indicated by changed file properties) and new files will be included in the backup.

Figure 10A:
FIG. 10A shows an example of an initial state of a host during which a base copy of system objects may be created in a full backup, according to one or more embodiments.
Figure 10B:
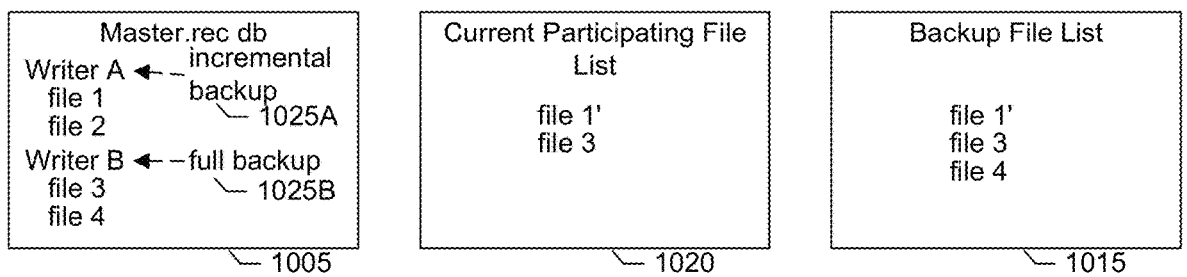
FIG. 10B shows an example of a subsequent state of the host during which an incremental system object backup may be conducted, according to one or more embodiments.
Figure 10C:
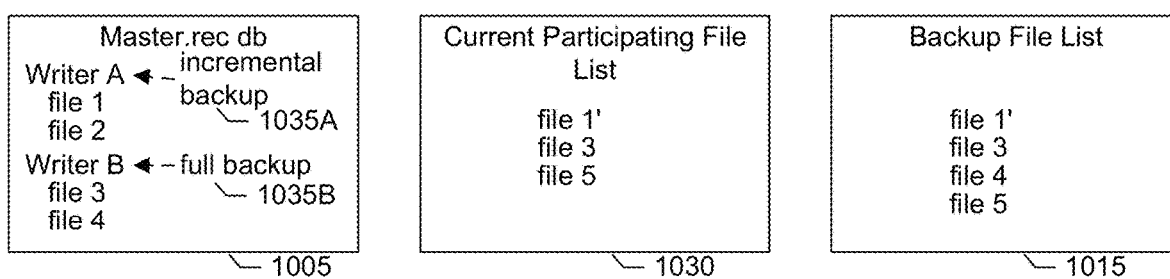
FIG. 10C shows another example of a subsequent state of the host during which an incremental system object backup may be conducted, according to one or more embodiments.

FIGS. 10A-C show examples of the writer tagging process for conducting backups. FIG. 10A shows an initial time where a mapping 1005 has been generated. The mapping lists writers and files that are associated with the writers. The mapping can be generated by requesting a list of writers from the copy service and then requesting that files associated with each writer be enumerated. In this example, writer A is associated with file 1 and file 2; and writer B is associated with file 3 and file 4. The mapping (including file properties) is saved in a database referred to as master.rec (steps 810,815, FIG. 8).

The mapping is initialized by tagging the writers with full backup tags 1010A,B (step 820). A base BMR or SSR backup copy is created by conducting a full backup of each writer tagged with the full backup tag (step 825). That is, all files associated with a writer tagged or marked with the full backup tag are added to a list of files 1015 to be backed up. Thus, the backup file list includes files 1, 2, 3, and 4.

FIG. 10B shows a subsequent time, after the initial time, of a next backup. A current listing of files 1020 that are to participate in this next backup is obtained from the VSS copy service (step 830). As shown in the example of FIG. 10B, the reported files include file 1 and file 3. The list of current files is compared with the files in the mapping to determine whether a particular writer in the mapping should be tagged or marked with the full backup tag or the incremental backup tag (step 835).

In this example, file 1 from the list of current files is present in the mapping stored in the master.rec database. Since file 1 is present in the mapping, the file properties of file 1 are examined to determine whether they have changed (step 920). In the example shown in FIG. 10B, a prime symbol is shown with file 1 to indicate that the file properties have changed. Thus, writer A associated with file 1 is marked with the incremental backup tag 1025A and file 1 is added to the backup file list (step 925).

The next file in the current list is file 3. File 3 is present in the mapping (step 915). The lack of the prime symbol indicates that the file properties have not changed. As discussed, however, a writer may not necessarily update file properties even though a file has changed. Thus, the writer associated with file 3 (e.g., writer B) is marked 1025B with the full backup tag to ensure that any changes are backed up. Accordingly, file 3 and file 4 are added to the backup file list. As shown in the example of FIG. 10, file 2 is not listed in the current participating file list and is associated with a writer (e.g., writer A) marked for an incremental backup. Thus, file 2 is not added to the backup file list.

FIG. 10C shows another example of a subsequent time, after the initial time, of a next backup. A current listing of files 1030 that are to participate in this next backup is obtained from the VSS copy service (step 830). As shown in the example of FIG. 10C, the reported files include file 1, file 3, and file 5. The list of current files is compared with the files in the mapping to determine whether a particular writer in the mapping should be tagged or marked with the full backup tag or the incremental backup tag (step 835).

In this example, file 1 from the list of current files is present in the mapping stored in the master.rec database. Since file 1 is present in the mapping, the file properties of file 1 are examined to determine whether they have changed (step 920). In the example shown in FIG. 10C, a prime symbol is shown with file 1 to indicate that the file properties have changed. Thus, writer A associated with file 1 is marked with the incremental backup tag 1035A and file 1 is added to the backup file list (step 925).

The next file in the current list is file 3. File 3 is present in the mapping (step 915). The lack of the prime symbol indicates that the file properties have not changed. As discussed, however, a writer may not necessarily update file properties even though a file has changed. Thus, the writer associated with file 3 (e.g., writer B) is marked 1035B with the full backup tag to ensure that any changes are backed up. Accordingly, file 3 and file 4 are added to the backup file list.

The next file in the current list is file 5. File 5 is not present in the mapping. Communication with the VSS copy service indicates that file 5 is associated with writer B. In this example, writer B has already been tagged with the full backup tag and file 5 is thus added to the backup file list (see, e.g., steps 915, 935, and 950, FIG. 9). The mapping stored in the master.rec database may be updated to add file 5 as being associated with writer B. As shown in the example of FIG. 10C, file 2 is not listed in the current participating file list and is associated with a writer (e.g., writer A) marked for an incremental backup. Thus, file 2 is not added to the backup file list. Tagging writers helps to backup complete writer data and support incremental backups.

Figure 11:
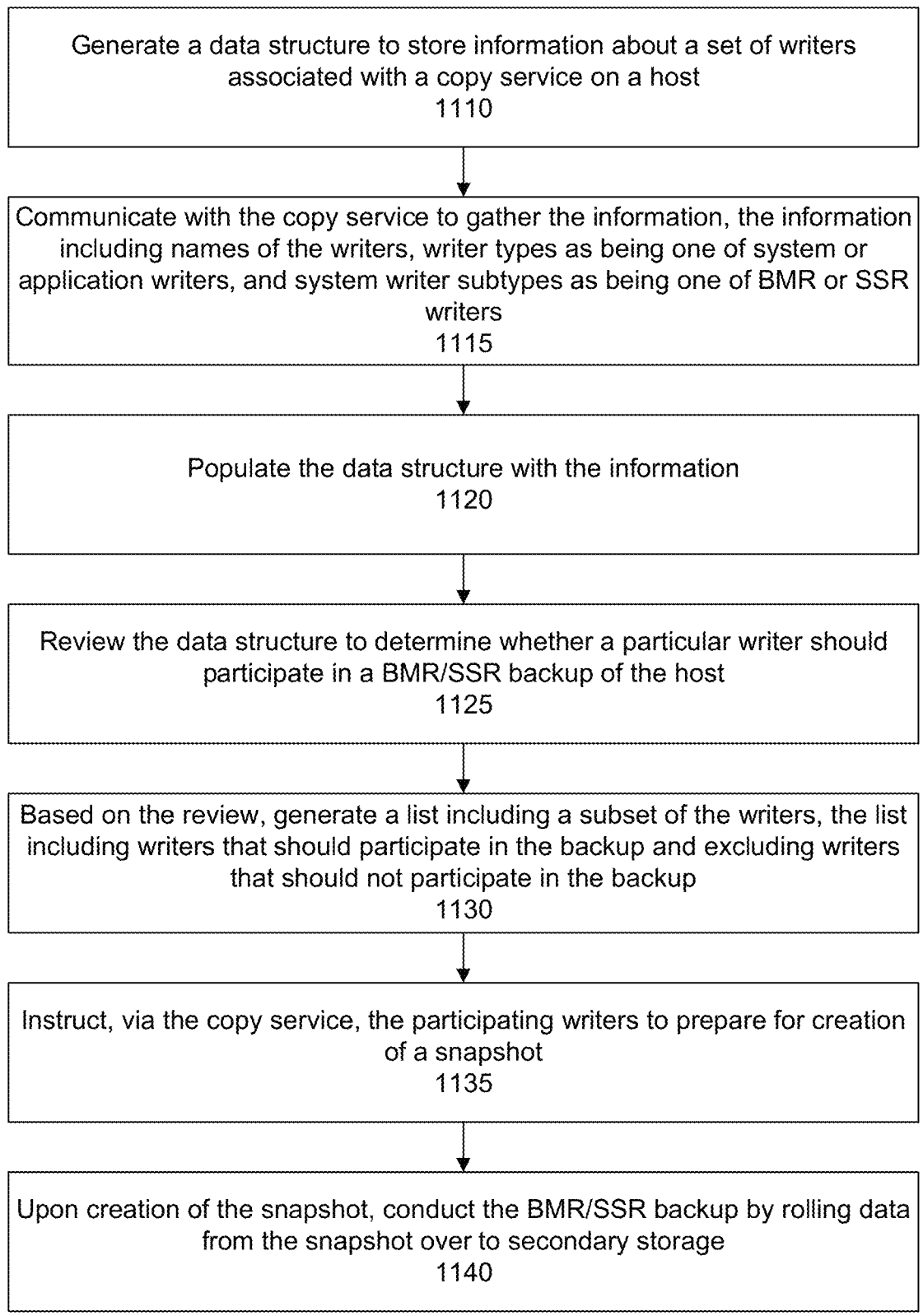
FIG. 11 shows a flow for dynamic backup and discovery of new writers, according to one or more embodiments.

FIG. 11 shows a flow for dynamic backup and discovery of new writers. In an embodiment, new writers introduced or added with new operating system versions that may be installed on the host are automatically discovered and without having to make code changes in order to support a newly added writer. A unique mechanism discovers newly added writers automatically and can add them as objects to be backed up. This eliminates the need to couple implementations of the data protection system to a static list of writers that are supported.

As discussed, on Microsoft platforms, data protection applications can use the copy service (e.g., VSS) framework to protect the operating system and applications installed on the operating system. All protection applications may be designed in accordance with this framework. According to the VSS framework, the data protection application depends on the application writer to facilitate the backup and restore operations.

A Windows OS includes two types of writers including system writers and application writers. System writers protect the system components. For example, there can be a registry writer to protect the registry database, a task scheduler writer to protect the task scheduler's task files, and so forth.

Application writers protect applications. For example, there can be a SQL writer to protect Microsoft SQL Server, an Exchange writer to protect Microsoft Exchange, and so forth.

Within a Windows operating system, the writers list may be dynamic and is based on the state of the system present at a particular moment. State of the system refers to what roles are installed and what applications are installed on the host. Further, as Windows introduces newer versions, newer writers may be added.

A backup application designed with a static list of writers that it can support will protect only those writers present in its static list of support writers. The backup application may check the current state of the system and validate it against the static list of writers it supports. This type of backup application protects only those writers that are present in its static supported writers list and skips other writers.

There is a need to address the dynamic nature of the Windows operating system. It is desirable that no matter what roles are installed on the host, no matter what applications are installed on the host, and no matter what Windows OS is being protected, that complete OS protection can be provided using a generic application (e.g., without having to release an update to the application).

More particularly, consider as an example that there is a static list of supported writers for a BMR or SSR operation. Before performing a snapshot operation (part of a backup operation), a backup application may scan the system for all the writers present on the system. The backup application may then check each writer identified with the static list. The writers that are present in the list participate in the BMR/SSR operation, while the writers that are not present in the list may be skipped from backup.

Consider further that Windows 2022 has introduced a new role. This role is associated with a writer that allows protection of a system component that will participate in a BMR/SSR operation. So, a data protection product released in 2021 will not be able to provide complete protection for the Windows 2022 release. There is a need to remove the dependency of the backup application from the static writer list.

FIG. 11 shows a technique for removing this dependency. In a step 1110, a data structure is generated to store information about a set of writers associated with a copy service on a host. In a step 1115, communication is initiated with the copy service to gather the information. The information includes names of the writers, writer types as being one of system or application writers, and system writer subtypes as being one of BMR writers or SSR writers. In a step 1120, the data structure is populated with the information.

Table A below shows an example of in-memory data structure that may be maintained on the host to store writer details.

TABLE A

| Data member | Explanation |
| --- | --- |
| Writer name | Name of the Writer |
| Writer type | Identifies the writer type.<br>There can be 2 possible values -<br>1. SYSTEM WRITER<br>2. APPLICATION WRITER |
| System writer sub type | Identifies the System writer type.<br>There can be 2 possible values -<br>1. BMR<br>2. SSR |

In an embodiment, there is an identification phase. The identification phase includes scanning the writers present on the host and populating the data structure shown in table A above.

While populating the data structure, each writer is examined to identify whether it is a system writer or an application writer. The writers can be identified using VSS framework information SYSTEM Writers—VSS_UT_BOOTABLESYSTEMSTATE and VSS_UT_SYSTEMSERVICE; and APPLICATION Writers—VSS_UT_USERDATA.

In other words, the writer property "VSS_UT_BOOTABLESYSTEMSTATE" indicates that the data stored by the writer is part of the bootable system state. The writer property "VSS_UT_SYSTEMSERVICE" indicates that the writer either stores data used by a system service or is a system service itself. The writer property "VSS_UT_USERDATA" indicates the data is user data. These writer identifications can be made by interrogating the copy service or issuing requests to the copy service to request the writer details.

If the writer being examined is a system writer, a determination is made as to whether it needs to participate in a BMR operation. For example, an Automated System Recovery (ASR) writer needs to be part of BMR operation as it protects the OS boot information. The ASR writer can be used to check which volumes include Windows services. The ASR writer can be excluded from the SSR operation. The information shown in table A is populated for all the writers present on the host.

The identification phase allows for new writers on the host to be discovered and identified. If the writer type is of type application writer and it does not have dependency on a system component this writer can be skipped from the backup operation. If, however, the new writer identified is of type system writer, it will automatically be added to a list of writers that should participate in the backup operation.

More particularly, once the identification phase is complete, the backup operation process moves to a preparation phase. In a step 1125, the data structure is reviewed to determine whether a particular writer should participate in a BMR or SSR backup of the host. In a step 1130, based on the review, a list is generated including a subset of the writers. The list includes writers that should participate in the backup operation and excludes or omits writers that should not participate in the backup operation. The excluded writers can continue their processing uninterrupted.

In other words, the identification phase identifies a listing of writers and their corresponding types. The list is filtered using the criteria fields writer type and system writer sub type to obtain or filter out the writers that will participate in the BMR or SSR backup operation. A separate data structure of writers that are to participate in the backup operation based on these filtered results is maintained.

Once the list of writers that are to participate in the backup is ready, the process moves to an execution phase. In particular, in a step 1135, the writers that are to participate in the backup operation are instructed via the copy service to prepare for creation of a snapshot. The participating writers then freeze or suspend the I/O writes so that any data residing in the memory buffers can be flushed to disk thereby ensuring files associated with the writers are brought to a consistent state for creation of the snapshot. Once a provider creates the snapshot, the copy service can release the writers from their temporary state of freeze so that any I/Os that have been queued can be completed. In a step 1140, upon creation of the snapshot, the BMR or SSR backup proceeds to roll over data from the snapshot to secondary or backup storage.

In an embodiment, the VSS framework is used to perform the snapshot operation. After or post snapshot the data is backed up to a secondary storage device. The technique shown in FIG. 11 allows for removing the dependency on supporting a static list of writers. This technique allows for a generic application to be used to protect any Windows OS or newly introduced writers.

Figure 12:
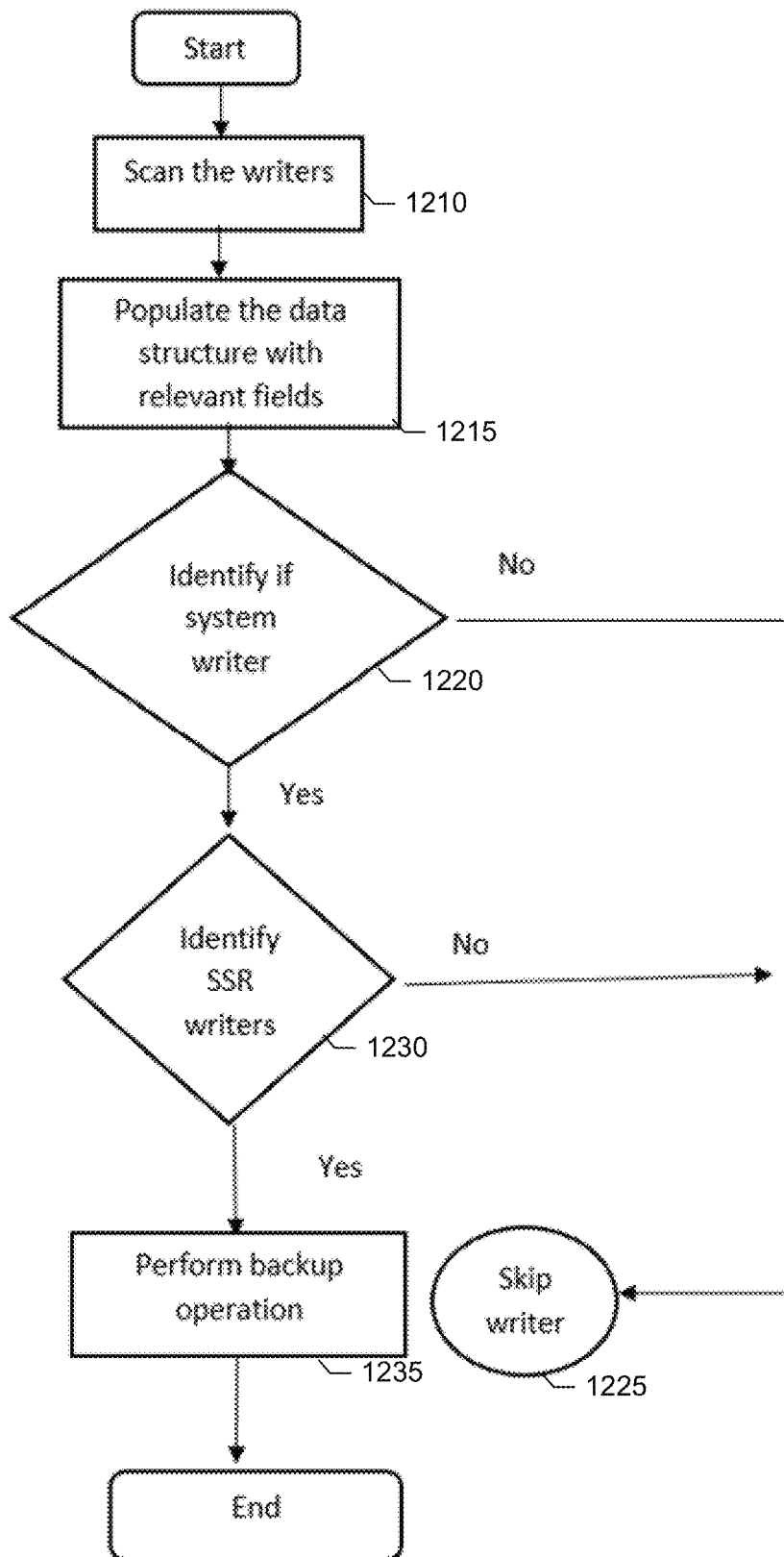
FIG. 12 shows another flow for dynamic backup and discovery of new writers, according to one or more embodiments.

FIG. 12 shows another flow detailing steps to conduct a BMR or SSR backup operation, according to one or more embodiments. In a step 1210, writers associated with a copy service are scanned. In a step 1215, the data structure (see, e.g., table A above) is populated with values for the relevant fields. In a step 1215, each writer identified in the data structure is reviewed to determine whether the writer is a system writer. If the writer is not of type system writer, the writer is skipped (step 1225). If the writer is a system writer, in a step 1230, the writer is further examined to determine whether the writer is of type SSR writer. If not, the writer is skipped (step 1225). If the writer is of type SSR writer, the writer is included or added to a list of writers that are to participate in the backup operation. In a step 1235, the backup operation is performed using the participating writer list.

Using the above techniques, any new writers that have been added since a last backup can be discovered and identified to determine whether it should participate in the backup. The techniques allow for very granular control over which writers are to participate in the backup. Writers not participating in a BMR or SSR backup, such as application writers, are not frozen and can continue operations thereby limiting the amount of disruption.

Referring back now to FIG. 1, some disaster recovery scenarios may require a bare metal restore to a bare metal target host 142. Such a target host may be without any installed application programs or operating system, i.e., "bare." In an embodiment, the bare metal restore is facilitated via a preinstallation platform. To deploy, for example, a Microsoft Windows operating system, Microsoft provides a lightweight operating system referred to as Windows Preinstallation Environment (WindowsPE or WinPE). WinPE is a small operating system used to install, deploy, and repair Windows desktop editions, Windows Server, and other Windows operating systems. WinPE can run on the target host before any standalone operating system has been installed. WinPE allows for performing a limited set of tasks and is designed to execute completely from memory. WinPE is not a standalone operating system and is designed only for installation, deployment, and recovery and not for other tasks of an operating system. As such, it may automatically stop running after a non-alterable period of time (e.g., 72 hours). Further, once WinPE restarts, any changes or configuration changes and settings involving drivers and registry made before the restart may be lost. These built-in limitations prevent WinPE from being run as a standalone operating system.

In an embodiment, a BMR recovery of the bare metal target host includes booting the bare metal target host into a preinstallation OS 185 (e.g., WinPE). The preinstallation OS may be referred to as a temporary OS. For example, the target host may be booted using a bootable image (e.g., WinPE optical disc image (ISO)) loaded from a CD/DVD disk, universal serial bus (USB) drive, or other media attached to the bare metal target host, or booted via a preboot execution environment (PXE) using a network boot. In an embodiment, a preinstallation wizard 188 is bundled in a WinPE ISO image as a Java application. The preinstallation wizard is responsible for facilitating communications between the bare metal target host and backup management server in order to conduct a bare metal recovery of the host.

As discussed, in an embodiment, a data protection architecture includes the backup management server and software agents installed with the host operating system. These agents are the basic entities that facilitate communication to the backup management server and perform various protection operations such as backup, restore, and other administrative operations.

In the case of a BMR restore, WinPE operates on a very stringent system requirement regarding memory, storage, and the like. There are challenges with keeping the size of this ISO limited as a full-fledged software or operation system to connect with the backup management server cannot be installed on the host.

In an embodiment, this requirement is met by simulating agent service in memory which allows for connecting to the backup management server securely which is a unique and mandatory requirement. Call back connections are established in memory to receive backup storage system (e.g., Data Domain) credentials to restore backups to the target host.

In an embodiment, a technique to simulate agent service includes leveraging REST APIs exposed by the backup management server. In this embodiment, the preinstallation wizard is included with the preinstallation OS. For example, the wizard may be provided as a custom shell or script. The wizard may be referred to as a WinPE wizard. The wizard communicates in a secure manner with the backup management server to allow a user to select and recover a BMR backup copy to the bare metal target host. In an embodiment, the wizard is a tool or utility to help walk, step, or guide the user through the process of conducting a bare metal restore to the target host. This preinstallation environment, including the preinstallation OS and wizard, is designed with a very small footprint and can be stored in memory of the host. In an embodiment, the wizard is a Java application.

In this embodiment, communication between the backup management server (e.g., PPDM) and the wizard (e.g., WinPE wizard) is through REST API calls. The wizard uses public REST APIs to collect necessary resources from the backup management server and provide apt functionality to the user.

In order to maintain security using the public REST APIs, the calls made to the backup management server are secured by token-based authorization.

In an embodiment, the backup management server, considered as an entity by itself, is designed to communicate with agent-service through internal REST API calls. In this embodiment, to utilize this functionality, the WinPE wizard is designed to replicate the REST API endpoints which are hosted by the agent-service.

In an embodiment, to create a REST API service, a very lightweight microframework referred to as Spark may be utilized. Spark supports creation of web applications in Kotlin and Java8 with minimal efforts. It is very efficient, has a straightforward syntax and has minimal boilerplate. Using the Spark framework minimizes memory intake to bare minimum as compared to other more comprehensive frameworks.

Figure 13:
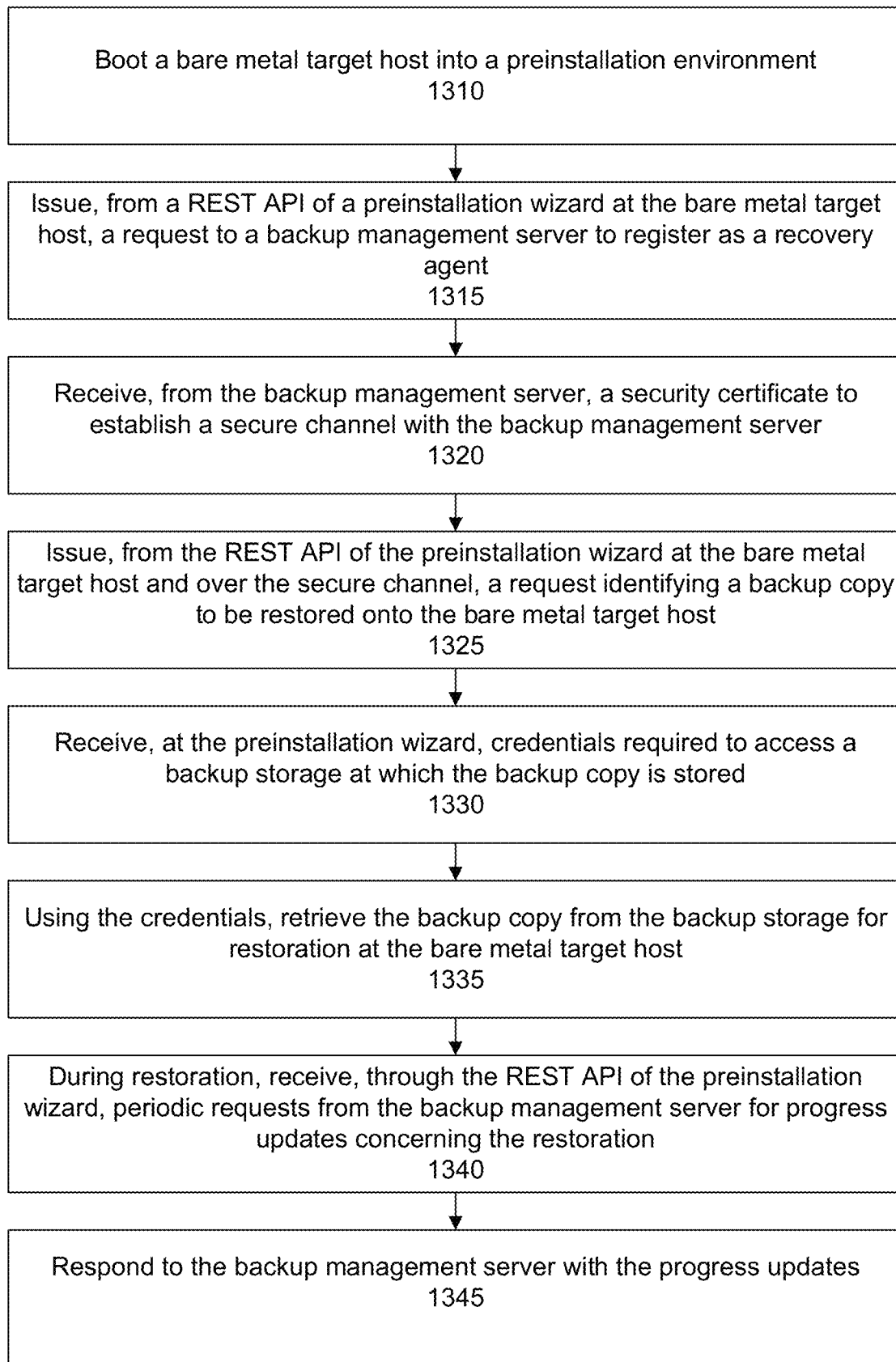
FIG. 13 shows a flow for in memory simulation of agent service for a secured restore, according to one or more embodiments.

FIG. 13 shows a flow for simulating agent service in memory at the bare metal target host in order to conduct a BMR recovery. In a step 1310, a bare metal target host is booted into a preinstallation environment. In a step 1315, a request to register as a recovery agent is issued to a backup management server. The request is issued from a REST API of an installation wizard at the bare metal target host.

In a step 1320, the installation wizard receives, from the backup management server, a security certificate (e.g., TLS certificate) to establish a secure channel with the backup management server.

In a step 1325, the installation wizard issues from the REST API and over the secure channel, a request identifying a backup copy to be restored onto the bare metal target host.

In a step 1330, the installation wizard receives credentials required to access a backup storage at which the backup copy is stored.

In a step 1335, the installation wizard, uses the credentials to retrieve the backup copy from backup storage for restoration at the bare metal target host.

In a step 1340, during the restoration, the installation wizard may receive via the REST APIs, periodic requests from the backup management server for progress updates concerning the restoration.

In a step 1345, the installation wizard responds to the backup management server with the progress updates.

Figure 14:
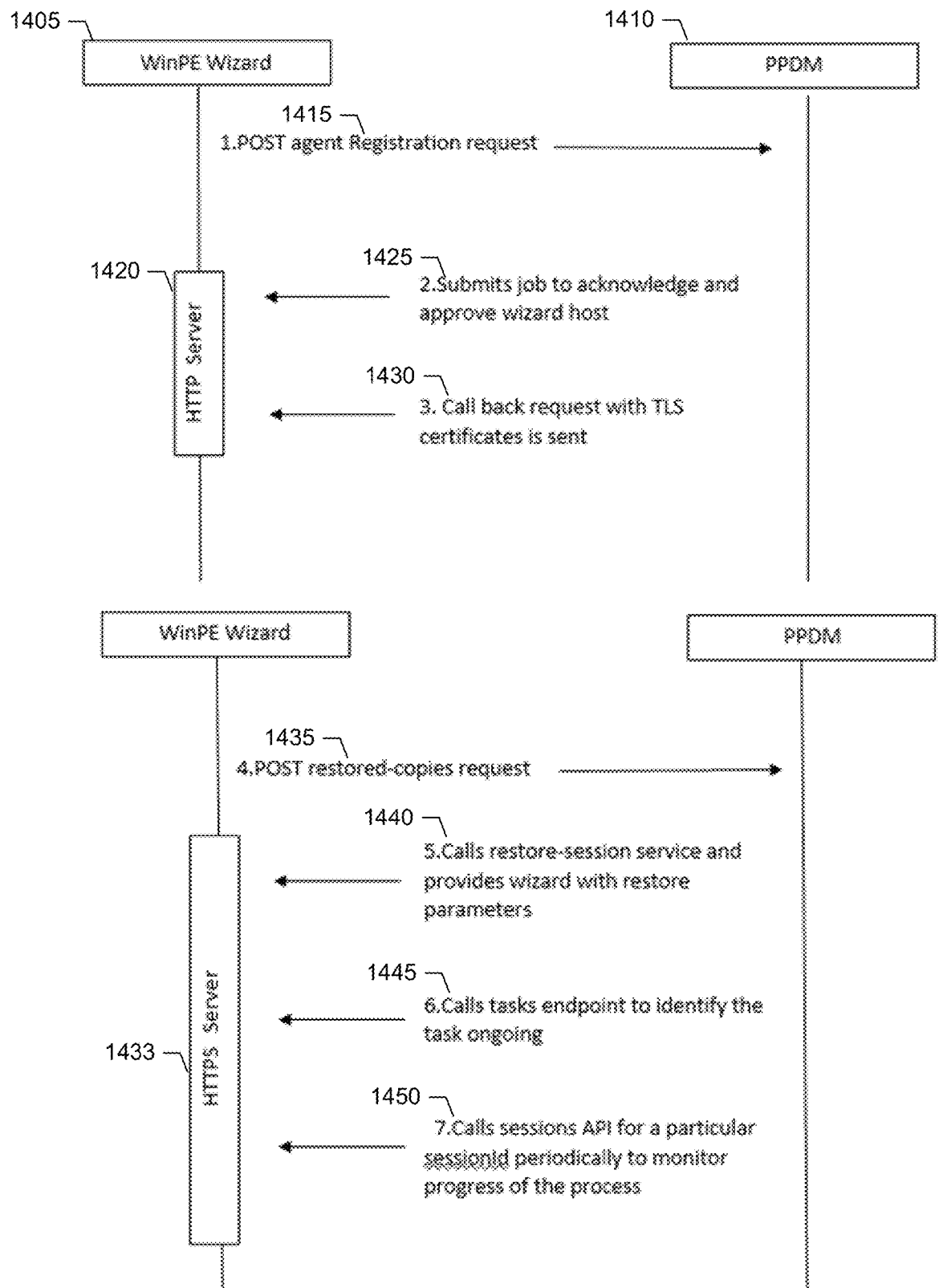
FIG. 14 shows a swimlane diagram for in memory simulation of agent service for a secured restore, according to one or more embodiments.

FIG. 14 shows a swimlane diagram illustrating the communications and interactions between an installation wizard (e.g., WinPE wizard) 1405 and the backup management server 1410. In a first step 1415, the installation wizard makes a POST request to the backup management server to request registration as an agent. Concurrently, the wizard hosts an HTTP server 1420 exposing necessary API end points.

In a second step 1425, the backup management server, in turn, submits an approval request to the wizard to acknowledge its existence and to check if the port is open for further communication to take place.

In a third step 1430, upon the backup management server receiving a successful response from the previous request, the backup management server further generates transport layer security (TLS) certificates and sends it to the wizard through a call-back request to authenticate itself.

These three steps conclude the registration process of the wizard into the backup management server. The wizard now opens a secure channel for communication of sensitive information with the backup management server by hosting an HTTPS server 1433.

In a fourth step 1435, once a desired backup copy is selected by the user, the wizard sends a restored-copies request, requesting that the backup management server restore the copy by providing identification, type of restore and other related information.

In a fifth step 1440, the backup management server acknowledges this request by sending a request payload to the wizard. This request payload contains the credentials—e.g., the username, password and the device path, taskID with other parameters—required to access the secondary or backup storage system. The storage system credentials are required to perform the restore operation using the restore binary. The restore process then begins.

In a sixth step 1445, the backup management server makes periodic callback requests to query the tasks happening at the wizard end. The task ID obtained in the previous step is associated with the current restore. The wizard receives constant updates about the percentage completion through agent-bus. This information is used to reflect restore completion percentage on the backup management server console user interface (UI). This allows a user at the console to view an assessment of the progress of the restoration operation (e.g., restore 30 percent (%) complete, restore 60% complete, and so forth). With the updates, a sessionID identifying the restore session is also sent.

In a seventh step 1450, the backup management server also makes periodic callback requests to fetch the status of the session. A unique session ID is generated by the wizard for the restore session. The response to this call-back is the progress of the session, e.g., IN-PROGRESS, SUCCESS or FAILURE.

After the restore process is completed—with a failure or success status indicated on the backup management server console UI—the HTTPS server service is terminated. Upon completion of the restore, the target host may be rebooted into the standalone or permanent operating system.

In an embodiment, this workflow is implemented in java to suit the needs of the wizard while considering minimal storage and memory requirements and maintaining existing security measures.

As discussed, in an embodiment, the WinPE ISO is a standalone bare minimum OS. This OS needs to be configured with network settings in order to communicate with the backup management server (e.g., PPDM server). This communication is required as the WinPE wizard needs to fetch information such as the backup copies, its location, secured password, and the like to perform a restore of the bare metal target host. Thus, network configuration plays an important role in setting up the network for this WinPE ISO.

Figure 15:
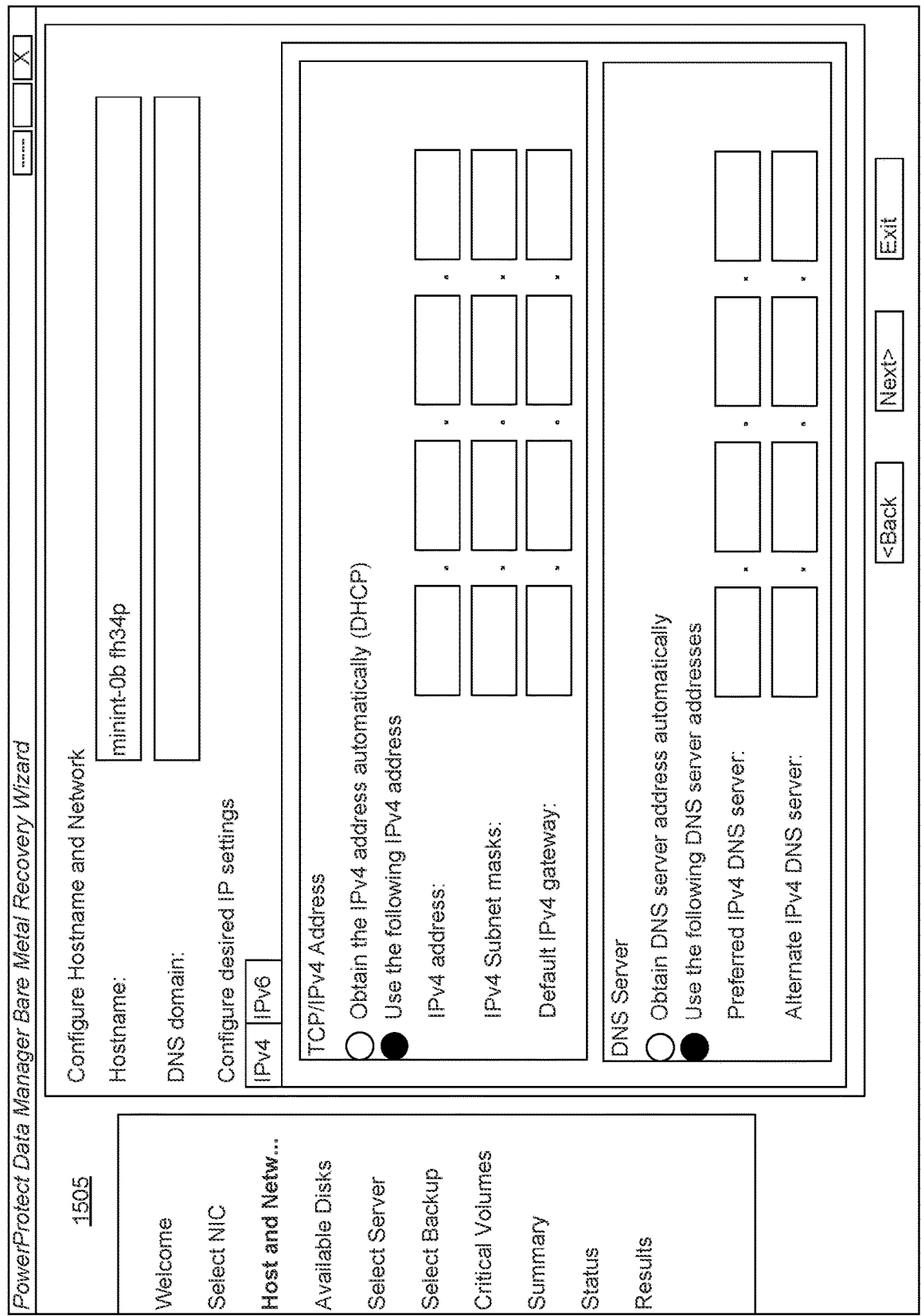
FIG. 15 shows a screenshot of a dialog box having network configuration settings of a host, according to one or more embodiments.

FIG. 15 shows a screenshot of network configuration details 1505 that may be required to establish communication between the preinstallation OS environment at the target host and backup management server. As shown in the example of FIG. 15, these network configuration details or network settings include, among other information, hostname, IP address settings, and so forth.

It would be desirable to free the user from manual network configuration of the target host that needs to be recovered and having to recall all the network settings. There is a need for an automated technique so that problems such as hostname or IP address conflict (e.g., duplicate hostnames or IP addresses), incorrect domain name system (DNS) setting and so forth can be avoided. Having to deal with such problems leads to a lot of time wasted in troubleshooting even after a successful restore.

In an embodiment, systems and techniques are provided to fetch the network configuration details of the host automatically during the BMR restore. The user will not have to remember original host details such as user credentials. In embodiment, a two-phased approach to automatically populate network configuration settings of a target host that is replacing an original host is employed. The first phase includes a caching phase. The second phase includes a restore phase.

Figure 16:
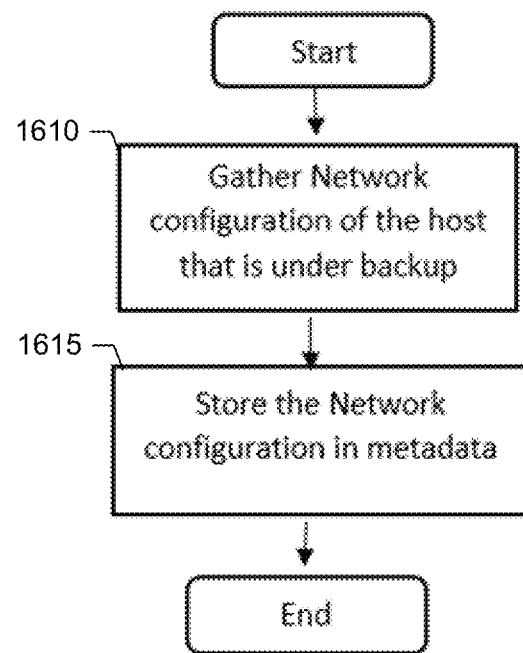
FIG. 16 shows a flow for automatically populating original host network configuration details for a BMR restore, according to one or more embodiments.

FIG. 16 shows a flow for the caching phase. In a step 1610, network configuration details of a host that is under backup are gathered. That is, the network configuration details may be gathered during a backup operation of the host. In a step 1615, the network configuration details may be stored as metadata.

Table B below shows an example of network configuration details that may be gathered during the backup operation.

TABLE B

| Field | Comment |
|---|---|
| Host Name | Machine name |
| DNS name | Domain name with which the machine is associated |
| IP configuration type | Type of IP configuration. Possible values - STATIC DYNAMIC (DHCP) |

TABLE B-continued

| Field | Comment |
| --- | --- |
| IPV4 IP | Only used if configuration is STATIC |
| IPV4 subnet mask | Only used if configuration is STATIC |
| IPV4 gateway | Only used if configuration is STATIC |
| DNS | Type of DNS. Possible values - STATIC Automatic |
| Preferred IPV4 DNS | Only if DNS is STATIC |
| Alternate IPV4 DNS | Only if DNS is STATIC |

As shown in the table above, the fields include host name, DNS, IP configuration type (e.g., static or dynamic), IPV4 IP, IPV4 subnet mask, IPV4 gateway, DNS settings, and so forth. This table is populated with each BMR backup of the host and saved as metadata with the resulting BMR backup copy. This allows the target host to be recovered to be configured automatically with the same configuration details as the original host.

In an embodiment, each BMR backup operation of the host includes gathering network configuration details of the host. Once the network configuration information is collected, the information may be stored as metadata with each BMR backup copy.

Figure 17:
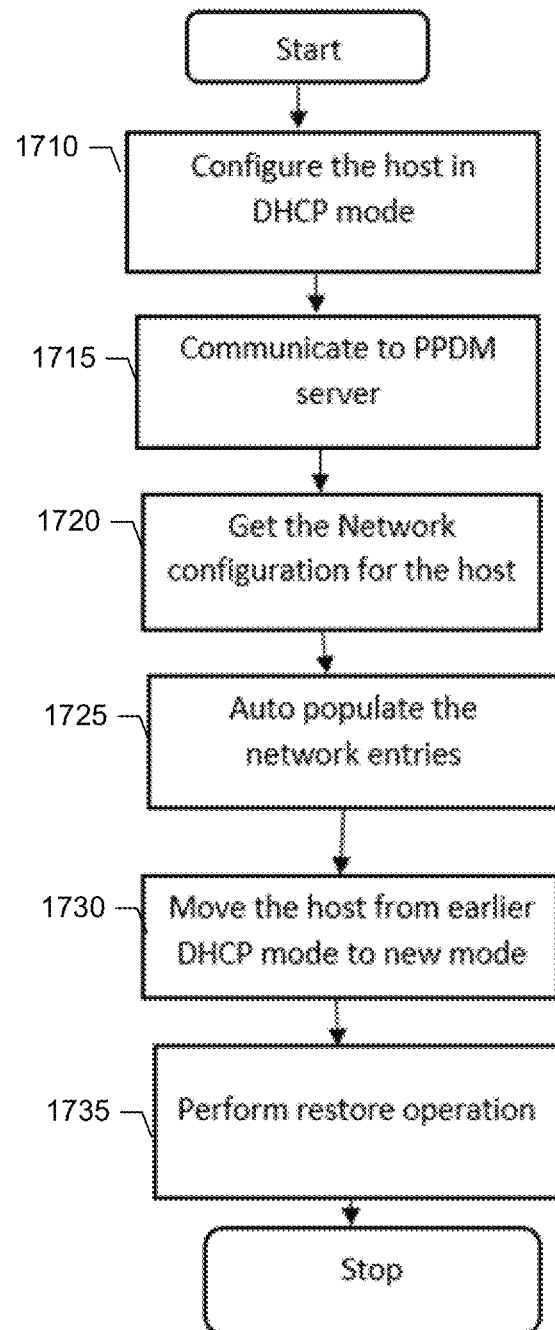
FIG. 17 shows another flow for automatically populating original host network configuration details for a BMR restore, according to one or more embodiments.

FIG. 17 shows a flow for the restore phase of performing a BMR recovery of a bare metal target host. In a step 1710, upon the bare metal target host booting from a WinPE ISO, a Windows network API is used to configure the bare metal target host in dynamic host configuration protocol (DHCP) mode. This enables basic network connectivity for the host. The mode allows the target host to query, as a Microsoft Windows client, the backup management server. For example, as discussed, in an embodiment, the WinPE ISO includes a preinstallation wizard implemented as a Java application. The preinstallation wizard issues commands to the Windows network API to configure the target host into DHCP mode. DHCP is a standardized protocol that enables the host to be dynamically assigned with various configuration parameters, such as an IP address, subnet mask, default gateway, and other critical network configuration information. Upon being configured in DHCP mode, the host may initiate a request to search for the backup management server (e.g., DHCP server). The DHCP server, upon receiving the request, responds with the IP address and other related network configuration information Details about the host for which the user wishes to perform the restore operation are obtained from the user. The details may include, for example, the name or other identifier of the host for which BMR backup copies were conducted.

In a step 1715, the host details are communicated from the target host to the backup management server via the network connectivity that was established using the dynamic host configuration protocol. The backup management server, upon receiving the host details provided by the user, returns a listing of BMR backup copies that have been taken for the host. The user can review the backup listing and select a BMR backup copy to restore to the bare metal target host.

In a step 1720, once the user selects the backup copy, network configuration for the host that was saved as metadata for that backup copy is downloaded from backup or secondary storage to the bare metal target host.

In a step 1725, the metadata (e.g., network configuration details) is read and automatically populated into the network configuration fields of the wizard (see, e.g., FIG. 15). The user can continue with the auto-populated settings or make edits. Upon accepting the network configuration settings, the network of the bare metal target host is reconfigured accordingly. This allows, for example, a target host that is replacing a host of a cluster to be automatically configured with the same IP address, hostname, and other network settings so that the target host can join the cluster.

In a step 1730, the target host is moved from the earlier DHCP mode to a new mode (e.g., Point-to-Point Protocol over Ethernet (PPPoE)) and the restore operation proceeds (step 1735).

Figure 18:
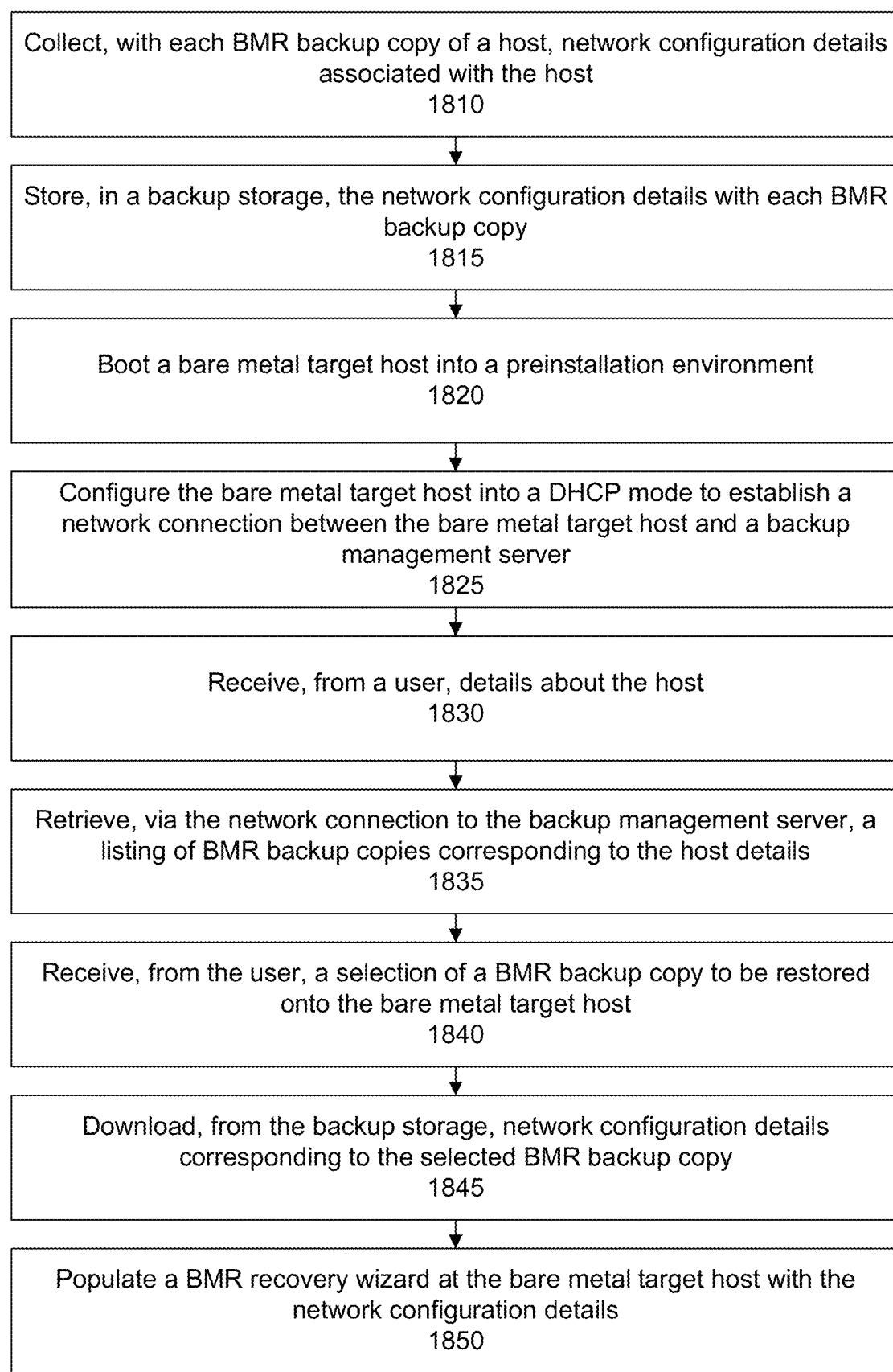
FIG. 18 shows another flow for automatically populating original host network configuration details for a BMR restore, according to one or more embodiments.

FIG. 18 shows another flow for automatically populating network configuration details of a host during a BMR restore. In a step 1810, network configuration details associated with a host are collected with each BMR backup of the host. In a step 1815, the network configuration details collected with each BMR backup are stored with each BMR backup copy in backup storage.

When there is a need to perform a BMR recovery, a bare metal target host is booted into a preinstallation environment (step 1820). As discussed, in an embodiment, the target host is booted from a Windows ISO image file having a WinPE ISO and into which a recovery wizard has been bundled as a Java application.

In a step 1825, the recovery wizard issues commands to configure the bare metal target host into a DHCP mode. The DHCP mode allows for the assignment of a dynamic IP address to the host thus establishment of a network connection between the bare metal target host and the backup management server.

In a step 1830, details about the host to be recovered are received from the user. The host details may include, for example, information identifying the host or BMR backup copies taken of the host.

In a step 1835, a listing of BMR backup copies corresponding to the host details are retrieved over the network connection established between the backup management server and the bare metal target host.

In a step 1840, a selection of a BMR backup copy to be restored to the bare metal target host is received from the user.

In a step 1845, network configuration details corresponding to the selected BMR copy are downloaded from backup storage to the bare metal target host.

In a step 1850, a recovery wizard (e.g., BMR recovery wizard) at the bare metal target host is populated with the network configuration details. The user can edit the network configuration details, if needed, and click a "next" button on the wizard to configure the target host with the displayed network settings (see, e.g., FIG. 15).

Referring back now to FIG. 1, in an embodiment, the data protection agent includes a disaster recovery (DR) asset sizer 191. The asset sizer is responsible for calculating a size of a BMR or SSR asset. This includes, for example, sizes of volumes, files, writers, and other components included or associated with a BMR or SSR backup of the file system host.

Front End Terabyte (FETB) is the term used to denote the consumption of the available capacity on host. It is desirable that a data protection backup system provide such information to its customers. This information can help the customer understand how the capacity is used and how to optimize the usage and predict the future use. FETB protected capacity can also be used for licensing and to ensure that the data protection system is appropriately licensed based on the total data protected. For example, licensing models for the data protection backup system may be based on the total amount of BMR or SSR data being protected.

Generally, collecting FETB information for different agents of a data protection system (e.g., SQL, file system, and so forth) is very straight forward. There can be different agents for different applications that are to be protected. Consider, as an example, a file system agent. During the discovery operation, the file system agent checks the asset (e.g., drive C:\, D:\, and so forth) for a file system host. The file system agent obtains the information regarding the disk size and can check the consumed storage (using Windows API calls) and passes-on the information to the data protection backup management server. There are no dynamic variables in this case as the asset in question is physical in nature.

On the other hand, disaster recovery is a logical asset. There are no Windows APIs or available entity that can be used to obtain the available and consumed space for a disaster recovery asset. For example, a BMR or SSR backup may not necessarily correspond to an actual volume, may include portions a drive, different types of writers, and so forth.

BMR and SSR asset sizes are inaccurately reported due to the complicity involved in multiple system writers and their associated data. There are no direct API calls that will return the asset size of a logical asset. There is a need to provide such a capability to customers of the data protection backup system so that they can make an informed decision about planning their backup policies. There is a need to be able to accurately measure or calculate the number of front end terabytes of BMR or SSR data that is being protected. The size of protected data may not necessarily correspond to a size of a backup due to factors such as deduplication, compression, metadata created for a backup, and other factors.

In an embodiment, a technique for obtaining a size of a disaster recovery asset, in the absence of any Windows API to obtain the size, includes leveraging the copy service (e.g., VSS) framework.

Figure 19:
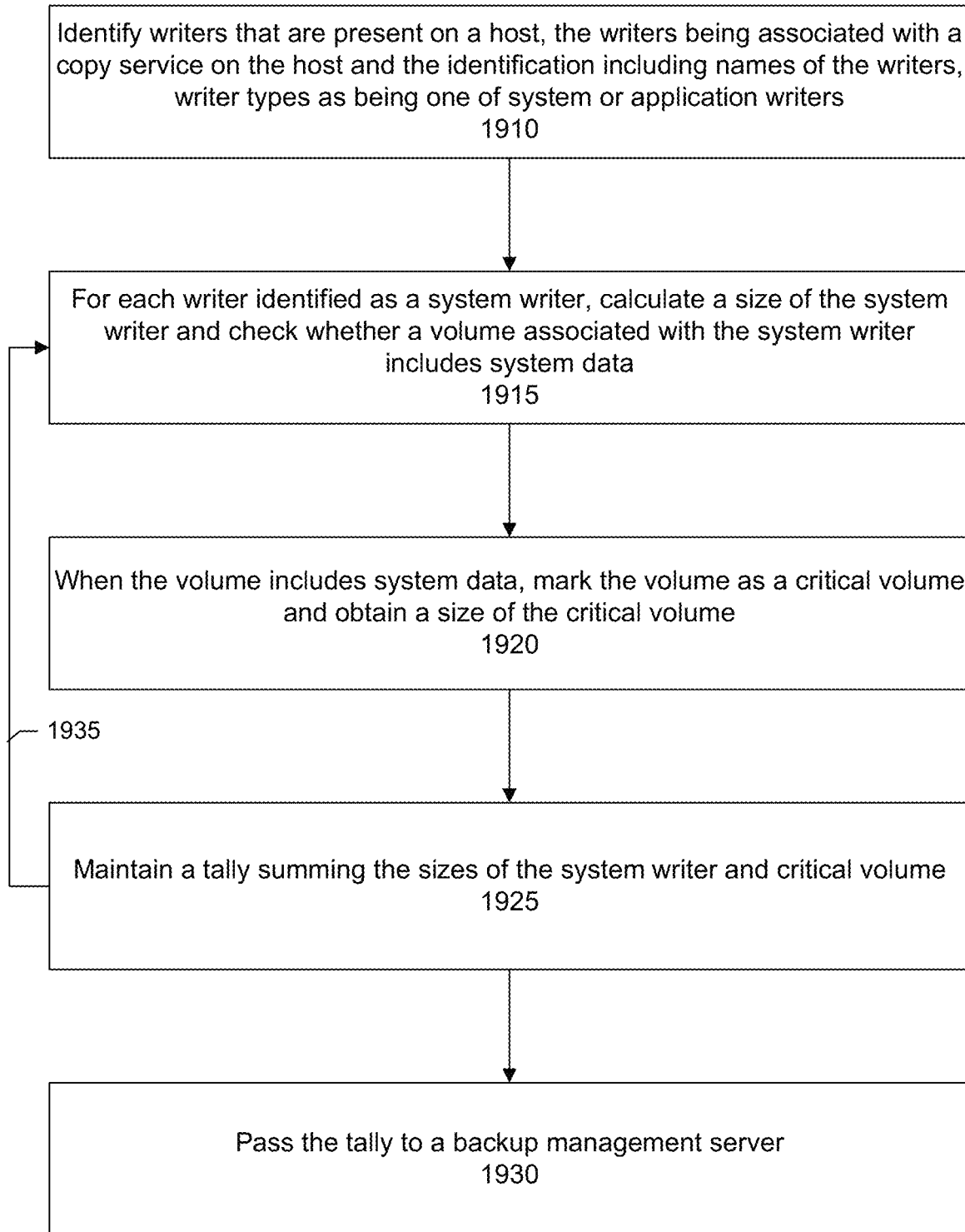
FIG. 19 shows a flow for disaster recovery asset sizing, according to one or more embodiments.

FIG. 19 shows a flow for disaster recovery asset sizing calculation. In a step 1910, writers that are present on a host are identified. The writers are associated with a copy servicer (e.g., VSS) on the host and the identification includes names of the writers, and writer types as being one of system writers to application writers.

In a step 1915, for each writer identified as a system writer, a size of the system writer is calculated and a check is made as to whether a volume associated with the system writer includes system data.

In a step 1920, when the volume includes system data or system writer components, the volume is marked as a critical volume and a size is obtained for the critical volume.

In a step 1925, a tally is maintained summing or totaling the sizes of the system writer and critical volume. The process loops back 1935 and repeats until all system writers have been checked and examined.

Thus, in an embodiment, sizes of the system and boot volumes are calculated along with the components or files associated with or enumerated by the system writers. Whether or not a writer is a system writer can be determined by examining the "VSS_USAGE_TYPE" attribute value as reported by the VSS copy service. Writers whose "VSS_USAGE_TYPE" attribute value is reported as "VSS_UT_BOOTABLESYSTEMSTATE" or "VSS_UT_SYSTEMSERVICE" are identified as system writers. In an embodiment, commands are issued to the copy service requesting that components or files associated with the system writers be enumerated. Sizes of components or files enumerated by the system writers are obtained and added to the tally.

In a step 1930, the tally is passed from the data protection agent to the backup management server. The tally may be reported as a front end terabyte (FETB) value indicating an amount of data that is protected in a bare metal recovery (BMR) or system state recovery (SSR) backup operation.

Figure 20:
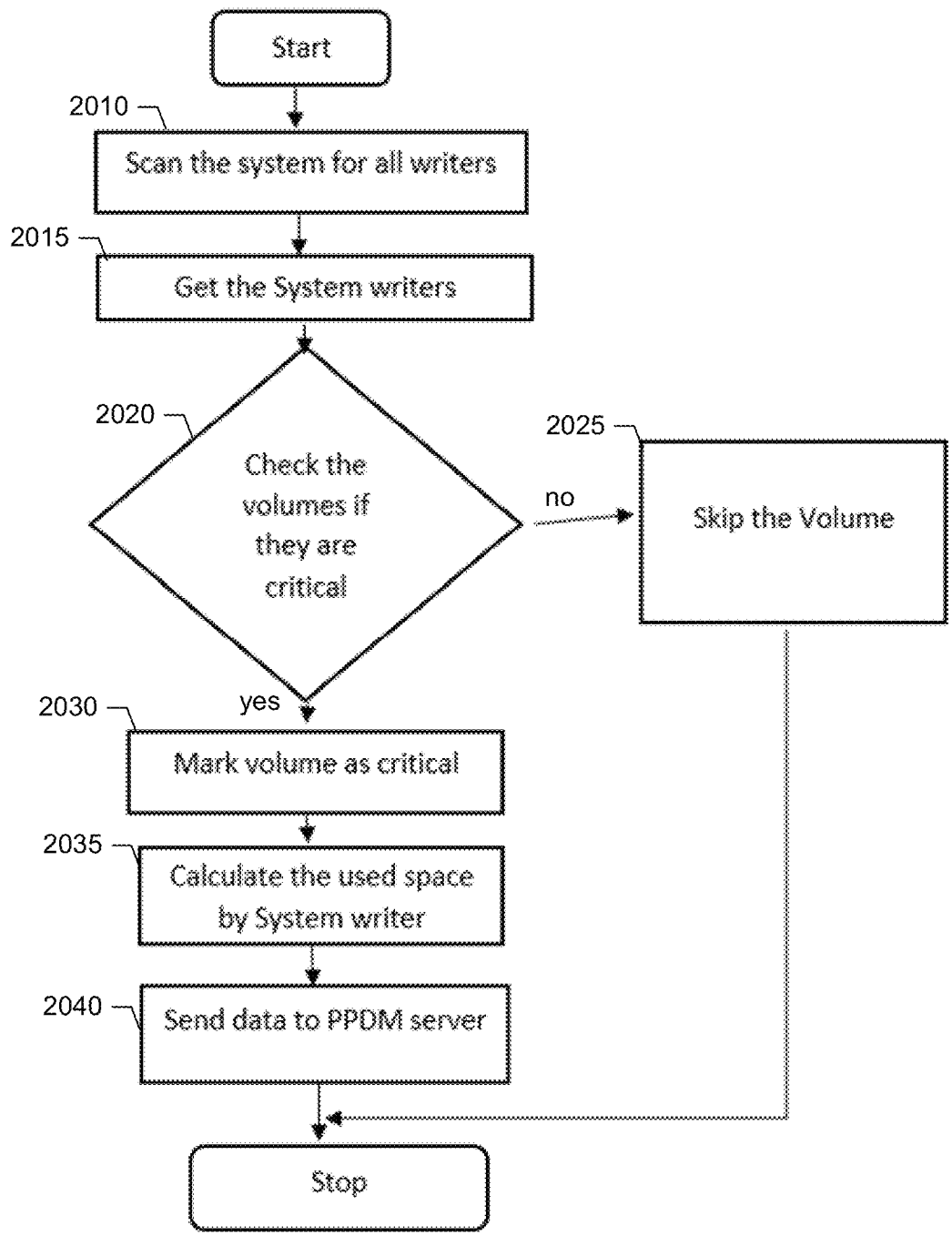
FIG. 20 shows another flow for disaster recovery asset sizing, according to one or more embodiments.

FIG. 20 shows another example of a flow for disaster recovery asset sizing calculation. In a step 2010, the host system is scanned for all writers present on the host. In a step 2015, the system writers are identified. Consider, as an example, that the host includes a Windows 2016 operating system, a C:\ volume having a size of 60 GB, a D:\ volume having a size of 100 GB, and an F:\ volume having a size of 55 GB.

Requests are made to the VSS framework to obtain a list of writers present on the host. Each writer present on the host is scanned. Writers that will participate in a BMR or SSR backup operation are identified using the VSS writer information properties or attributes "VSS_UT_BOOTABLESYSTEMSTATE" and "VSS_UT_SYSTEMSERVICE."

In a step 2020, volumes associated with the writers are checked to determine whether they are critical. In a step 2025, writers that are not critical are skipped. In a step 2030, volumes that are critical are marked as such. More particularly, for the writer identified as a system writer (step 2015), a deep dive or further examination is conducted into in its components (e.g., files) it will protect. The deep dive includes checking the physical location of the components to identify the drive or volume having the components. Volumes are identified individually. For example, consider that component) was C:\system32\file1.db and component2 was D:\appdata\file2.db. In this example, C:\ and D:\ are marked as critical volumes.

As seen in example above of the system having three volumes C:\, D:\ and F:\ only C:\ and D:\ are marked as critical. Volume FA is not hosting any system data hence it will not participate in the BMR or SSR operation. Volume FA is hosting user data and thus, volume FA is not marked as critical.

In a step 2035, the space used by the system writer is calculated. In a step 2040, the used space data is sent by the data protection agent to the data protection backup management server. In other words, the summation of C:\ and D:\ is marked as available space for FETB calculation (e.g., 60 GB plus 100 GB equals 160 GB).

Also calculated is the component (e.g., file) size of system writers to obtain an accurate calculation of used space or consumed space. More particularly, once the writers and component information has been gathered, the system writers and their corresponding components or files are scanned to identify all the files that will participate in a BMR or SSR operation and thus obtain the used space.

All this information is collected and passed on to the data protection backup management server as part of the discovery for a disaster recovery asset. Thus, both disk size (e.g., 160 GB) and consumed size calculations are made.

Referring back now to FIG. 1, in the VSS copy service framework, the writers can be broadly classified into two major types including system writers and application writers. The role of system writers is to protect the system (e.g., operating system components, files, and related extensions). This means that if there is any corruption of system components the restore operation should bring back the system to its original state. On the other hand, the role of application writers is to protect the applications installed on the system.

This means that if there is any data loss or corruption of the application the restore operation should bring back the application to its original state.

A BMR or SSR backup mostly focuses on system writer protection. But in some situations, in order to realize complete BMR or SSR protection, it becomes necessary to protect the application or user data writers. In an embodiment, systems and techniques are provided to dynamically promote, during a BMR or SSR backup, application or user data writers to system type writers.

As discussed, the VSS framework includes an attribute referred to as VSS_USAGE_TYPE for each writer. The values for the attribute include VSS_UT_UNDEFINED, VSS_UT_BOOTABLESYSTEMSTATE, VSS_UT_SYSTEMSERVICE, VSS_UT_USERDATA, and VSS_UT_OTHER.

System components fall into two categories of either VSS_UT_BOOTABLESYSTEMSTATE or VSS_UT_SYSTEMSERVICE. But there are writers of VSS_UT_USERDATA type whose components can contain system data.

In an embodiment, for BMR backups the critical volumes are identified using the information described above and all critical volumes are included in the backup. For SSR backups the backup is limited to only the list of files from or enumerated by each of the system writers.

There remains, however, a need to add support for user data writers whose components are also system data. Some application writers may have dependencies on system writers or system components. There is need for a BMR or SSR backup to protect system state and also applications that have system dependencies.

In an embodiment, systems and techniques are provided to dynamically promote application or user data writer components to system writers by including those user data components in a BMR or SSR backup which are system data. A BMR or SSR backup that backups only system writers' components and excludes user data writers for BMR/SSR backup my miss certain system dependencies. In an embodiment, systems and techniques of a data protection backup system includes providing BMR and SSR protection by promoting certain user data writers components to system writers components.

In this embodiment, rather than merely identifying system writers, a further examination is conducted that includes reviewing the user data writer's components. If a component's name and logical path contains a Windows service (system component) then that component is promoted as system writers' components. Thus, all the system components which are directly mentioned or indirectly mentioned by the VSS copy service framework are protected. This helps to achieve complete protection of the system including components that may not be enumerated by a system writer but nonetheless include system data.

The logical path is a mechanism for describing a writer's components. It is used to express relationships between components and particularly their hierarchy. For example, if a writer managed several electronic books, it might assign logical paths of "\ebook\book1" and "\ebook\book2" to file group components containing each book.

Figure 21:
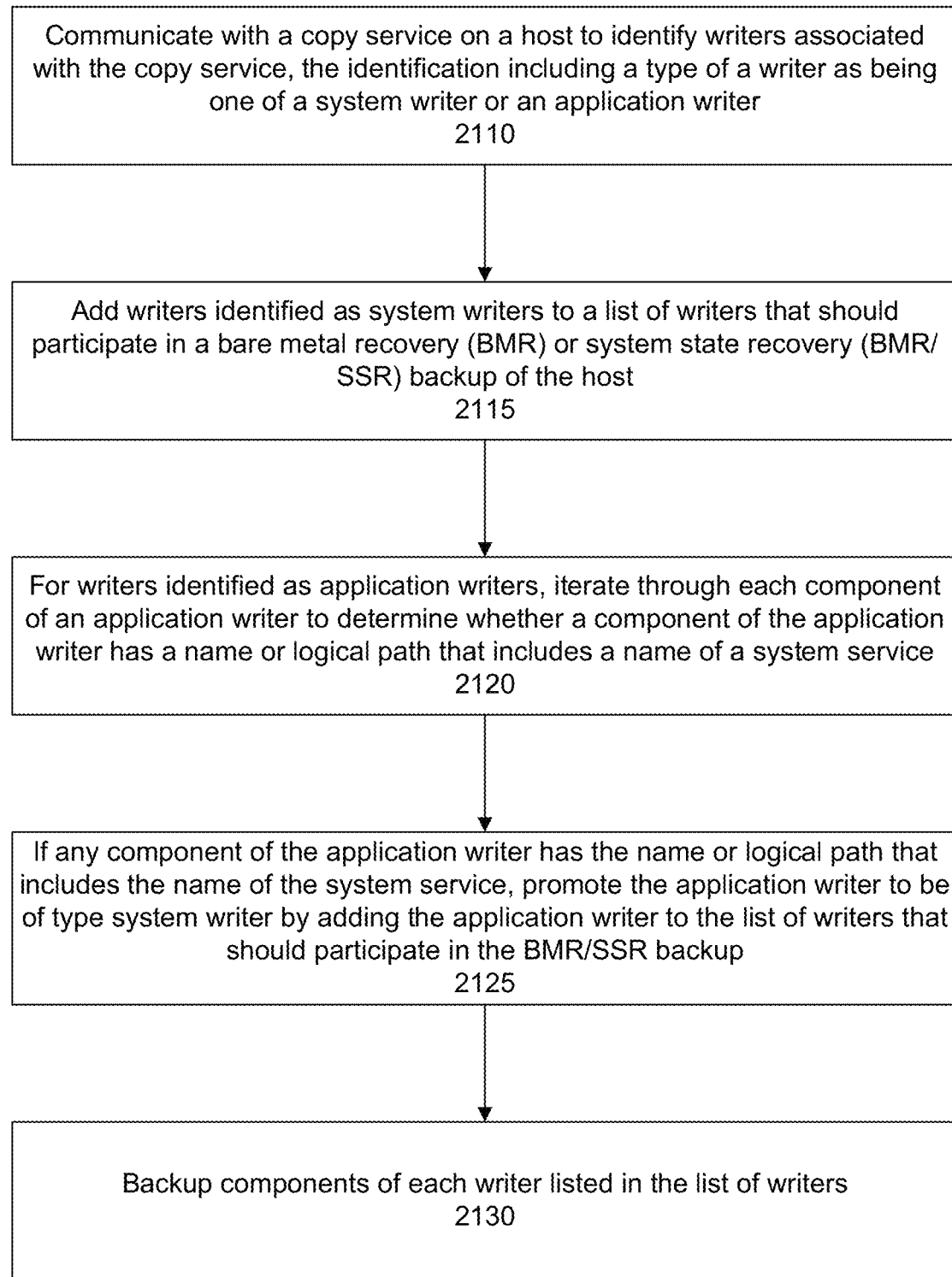
FIG. 21 shows a flow for dynamic promotion of user data writer components to system writer components, according to one or more embodiments.

FIG. 21 shows a flow for the dynamic promotion of user data to system writers. That is, in certain cases, components of user data writers are promoted to system writers' components. In a step 2110, communication is exchanged with a copy service (e.g., VSS) on a host to identify writers associated with the copy service, the identification including a type of a writer as being one of a system writer or an application writer.

In a step 2115, writers identified as system writers are added to a list of writers that should participate in a BMR or SSR backup of the host.

In a step 2120, for writers identified as application writers, a further review and investigation is performed by iterating through each component of an application writer to determine whether a component of the application writer has a name, logical path, or both that includes a name of a service that is a system service. Commands may be generated to request that the copy service enumerate components that the application writer owns or is responsible for.

In a step 2125, if any component of the application writer has a name, logical path, or both that includes a name of a system service, the application writer is promoted to be of type system writer by adding the application writer to the list of writers that should participate in the BMR or SSR backup operation. This helps to ensure that the application writer will be included among those writers instructed to complete their open transactions and flush their caches thus bringing their components to a consistent state prior to snapshot generation.

In a step 2130, components of each writer listed in the list of writers are backed up from the snapshot to secondary or backup storage.

Figure 22:
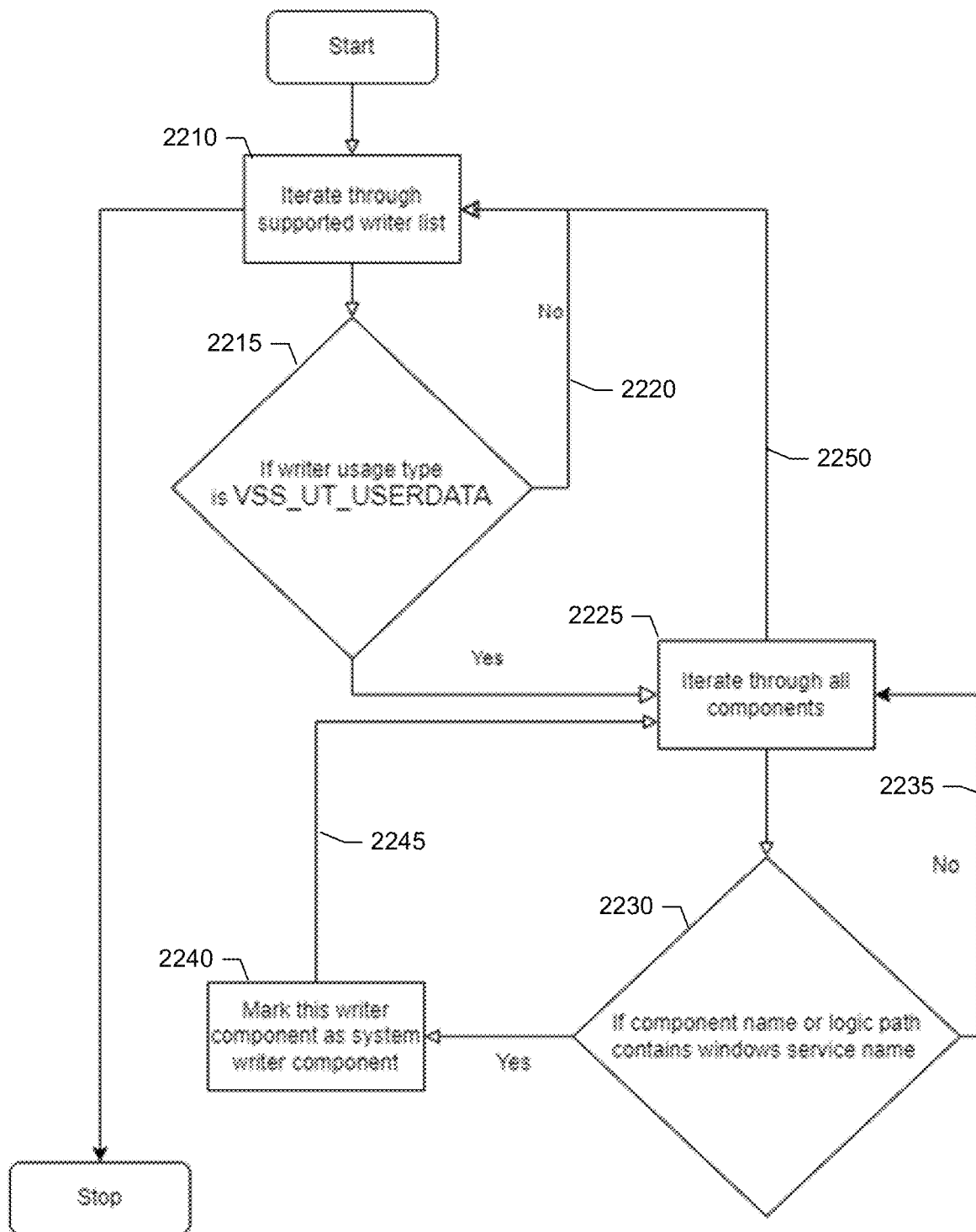
FIG. 22 shows another flow for dynamic promotion of user data writer components to system writer components, according to one or more embodiments.

FIG. 22 shows another example of a flow for the dynamic promotion of user data to system writers. In a step 2210, a process iterates through a list of writers. In a step 2215, a determination is made as to whether the attribute for writer usage type is set to VSS_UT_USERDATA. If not, the process loops back 2220 to select and examine a next writer.

If, however, the attribute for writer usage type is set to VSS_UT_USERDATA, the process iterates through all components of the writer (step 2225). In particular, in a step 2230, a determination is made as to whether a component name, logic path, or both contains a name that is a Windows service.

If the component name or logic path does not contain a name that is a Windows service, the process loops back 2235 to select and examine a next component of the writer.

If, however, the component name, logic path, or both contains a name that is a Windows service, this writer component is marked as a system writer component (step 2240). The process continues or repeats 2245 until all components of the writer have been examined and further continues 2250 until all writers having the writer usage type of VSS_UT_USERDATA have been examined.

Table C below shows another flow for the dynamic promotion of user data to system writers.

TABLE C

| Step | Description |
|---|---|
| 1 | Iterate through supported writers list |
| 2 | Iterate through System writers to gather backup information (VSS_UT_BOOTABLESYSTEMSTATE and VSS_UT_SYSTEMSERVICE) |
| 3 | Iterate through remaining writers, If writer usage type is VSS_UT_USERDATA then, a. Iterate through all components list b. If component name and logic path contain windows service names mark this writer component as system writer component. |
| 4 | Backup all components identified |

Consider, as an example, the Microsoft Message Queuing (MSMQ) Writer. The MSMQ writer is an application writer, but Windows OS uses it to maintain message queuing. Some Windows roles use this MSMQ to communicate messages with different components. If any Windows role (system writer) has dependency on MSMQ, the MSMQ writer is promoted from application writer to system writer.

Figure 23:
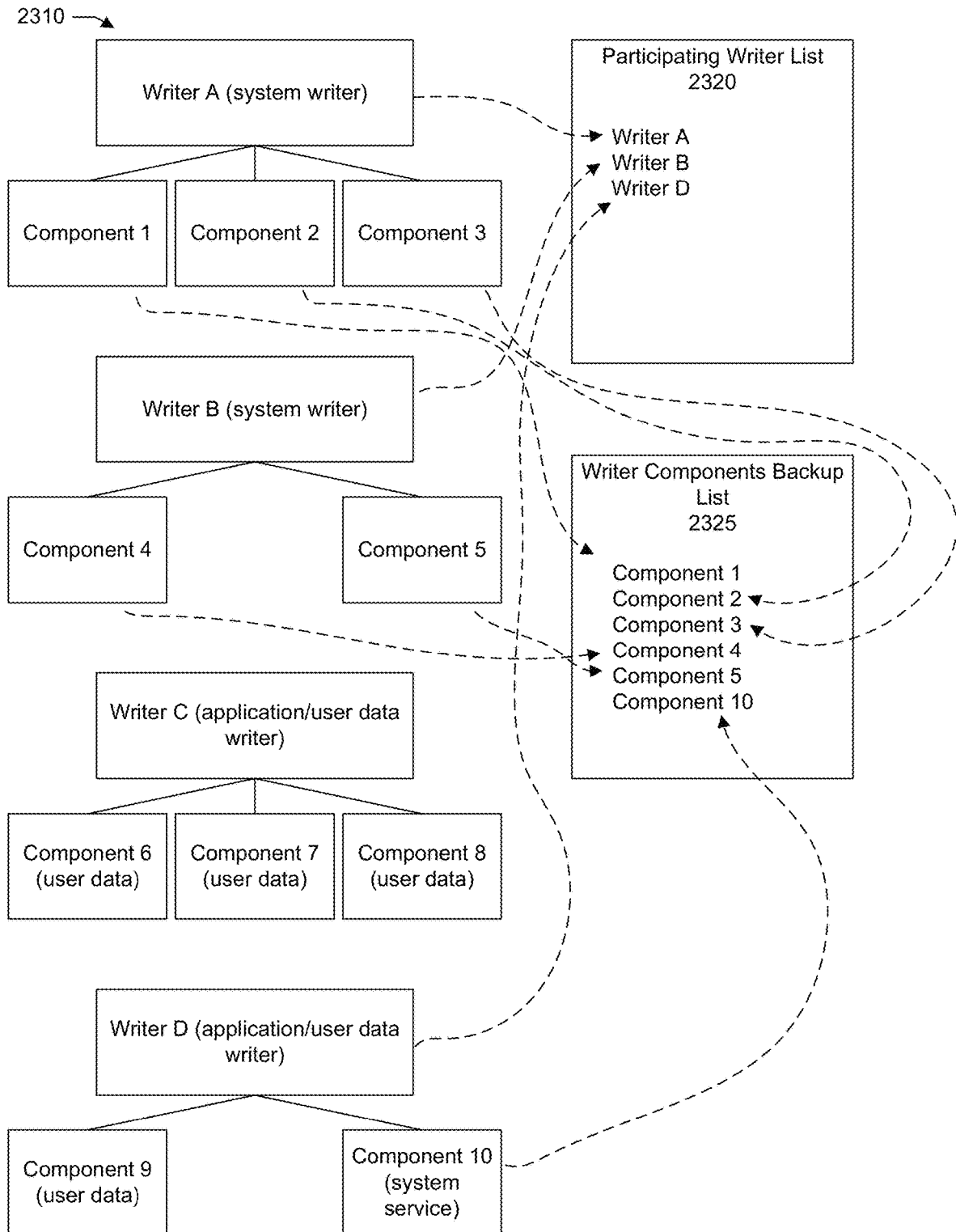
FIG. 23 shows a block diagram of an example for dynamic promotion of user data writer components to system writer components, according to one or more embodiments.

FIG. 23 shows a block diagram of a process for dynamic promotion of user data to system writers. In an embodiment, preparation for a BMR or SSR backup of a host begins with the data protection backup agent communicating as a requestor with a copy service to identify writers 2310 present on the host and their corresponding types. In the example shown in FIG. 23, the writers include writers A, B, C, and D. Writer A is a system writer and is responsible for components (e.g., files) 1, 2, and 3. Writer B is a system writer and is responsible for components 4 and 5. Writer C is an application/user data writer and is responsible for components 6, 7, and 8. Writer D is an application/user data writer and is responsible for components 9 and 10. In other words, writer A is responsible for guaranteeing data consistency for components 1-3, writer B is responsible for guaranteeing data consistency for components 4 and 5, and so forth.

Writers that should participate in the BMR/SSR backup include writers A and B because they have been identified as system writers. Thus, writers A and B may be added to a participating writer list 2320. All components owned by writers A and B may be added to a writer components backup list 2325. Thus, components 1-5 have been added to the backup list.

Writer C is an application/user data writer. As discussed, to ensure a complete BMR/SSR backup, each component owned by writer C is further examined to determine whether their corresponding names, logical paths, or both name a Windows service. These details may be gathered through communications with the copy service and reviewing the writer metadata provided by the copy service. In this example, none of the components owned by writer C are associated with a Windows service and are instead associated with user data. Thus, writer C is not included in the participating writer list.

Writer D is an application/user data writer. Again, to ensure a complete BMR/SSR backup, each component owned by writer D is further examined to determine whether their corresponding names, logical paths, or both name a Windows service. In this example, component 9 is not associated with a Windows service and is instead associated with user data. Component 10, however, is associated with a Windows service. For example, a name or logical path of component 10 may contain a name of a Windows service. Thus, writer D may be promoted to a system writer by being added to the participating writer list. The component owned by writer D having the name of the Windows service (e.g., component 10) may likewise be marked as a system writer component and added to the backup list.

Components of the promoted writer not having a name or logical path containing a name of a Windows service (e.g., component 9) may not be added to the backup list. That is, the components may be excluded or omitted from the backup list. This helps to reduce a size of the backup and thus time to complete the backup operation and space required to store the backup.

The data protection agent may then instruct, via the copy service, each writer in the participating writer list to prepare for snapshot generation. The participating writers (e.g., writers A, B, and D) upon receiving the instructions, may then prepare each of their components for creation of the snapshot. The preparation may include, for example, completing open transactions, rolling transaction logs, and flushing caches. Upon completion, each participating writer notifies the copy service. The copy service, in turn, instructs the participating writers to enter a temporary freeze state while a provider generates the snapshot.

Once the snapshot has been generated, the copy service unfreezes the participating writers. The data protection agent can then access the snapshot to continue with the BMR or SSR backup by rolling over data from the snapshot according to the writer components backup list (e.g., components 1-5 and 10).

Referring back now to FIG. 1, in an embodiment, a system state backup on Windows operating system backs up the operating system files, enabling the online recovery of a Windows OS. After the files are recovered a reboot is required to complete the restore. In this embodiment, the system state backup and restore uses Microsoft's Volume Shadow Copy service (VSS) to conduct the backup and restore. As discussed, system state backup includes the basic system including boot files, COM+ class registration database, and registry; domain controller including basic system and Active Directory (NTDS), and system volume (SYSVOL); system running cluster services including basic system and cluster server metadata; and system running certificate services including basic system and certificate data.

The Windows registry is a collection of databases of configuration settings for Microsoft Windows operating systems. This part of Windows stores much of the information and settings for software programs, hardware devices, user preferences, and operating system configurations. The registry stores this data grouped into multiple logical groups called hives. A hive includes keys, subkeys and values that has a set of supporting files loaded into memory when the operating system is started or a user logs in. The hives can be categorized into two buckets including system hives and user hives.

A VSS writer is a component of the VSS framework that guarantees a consistent data set to back up. This is typically provided as part of a line-of-business application, such as SQL Server or Exchange Server (application writer). VSS writers for various Windows components, such as the registry, are included with the Windows operating system (system writer). Non-Microsoft VSS writers are included with many applications for Windows that need to guarantee data consistency during backup.

The registry application includes hives. A hive is a logical group of keys, subkeys, and values in the registry that has a set of supporting files loaded into memory when the operating system is started or a user logs in. Table D below lists some standard hives.

TABLE D

HKEY_CURRENT_CONFIG
HKEY_CURRENT_USER
HKEY_LOCAL_MACHINE\SAM
HKEY_LOCAL_MACHINE\Security
HKEY_LOCAL_MACHINE\Software
HKEY_LOCAL_MACHINE\System
HKEY_USERS\.DEFAULT Each time a new user logs on to the host, a new hive is created for that user with a separate file for the user profile. This is called the user profile hive. A user's hive contains specific registry information pertaining to the user's application settings, desktop, environment, network connections, and printers. User profile hives are located under the HKEY_USERS key.

In an embodiment, there can be a registry backup and restore using the VSS copy service. Specifically, the registry application supports a VSS writer called the registry writer which allows a backup of system registry using data stored on a snapshot (e.g., a shadow copied volume). The registry writer reports only system hives; it does not report user hives (HKEY_USERS or new users logged on to machine). This means that if the VSS framework is used to backup the registry application the user hives will not be backed up. This leaves a gap in data protection of the registry as the user hives are not backed up and subsequently not available for restore.

During a restore phase the VSS registry writer instructs the backup application to restore the files to a temporary directory and then use the "PendingFileRenameOperations" registry key to inform the operating system to move the file from the temporary directory to the original location after reboot is done.

In another embodiment, there can be a registry backup and restore that does not use VSS and instead uses the Windows API and, more particularly, the Win32 API. The Windows API is a set of application programming interfaces provided in Windows operating systems. Specifically, another way to backup and restore the registry application is to use Win32 Registry API's. The Win32 API provide a slew of functions which can be used to configure and interact with Registry. The RegSaveKey and RegReplaceKey functions can be used to backup and restore individual registry hives.

Some of the user hives that were backed up will not be applicable for restore depending on the current state of the system. The current hive list is prepared by enumerating the registry hives using the Win32 registry API's. Using the Win32 API for the backup allows for backing up of both system and user hives, but still leaves a gap in protection for later Windows versions.

In particular, starting with Windows 2016 Microsoft introduced an additional layer of security for the critical "DRIVERS" hive which is not always loaded. The operating system loads the hive when it needs it and then unloads the hive. The RegSaveKey is not always guaranteed to be able to backup "DRIVERS" hive. The API will fail whenever the "DRIVERS" hive is unloaded. Similarly, RegReplaceKey also faces the same issue during restore and fails to restore the "DRIVERS" hive if it is not loaded. Hence the Win32 API method of backing up and restoring the registry cannot be used from Windows 2016 onwards.

The VSS method can restore the "DRIVERS" hive on Windows 2016 and onwards since it does not require the hive to be loaded and the hive file is replaced during reboot by the operating system.

Using the VSS method to protect the more critical DRIVERS hive results in not being able to protect the user hives. This leaves a gap in the protection of the registry application.

For enterprise customers, this can be a pain point as they can have multiple users on the system and not being able to protect the user hives can cause them to recreate every user setting and configuration from scratch in case the data is lost for any number of reasons.

In an embodiment, systems and techniques allow for complete protection of registry application data and even in cases involving Windows 2016 and later releases where the "DRIVERS" hive is unloaded. All the hives, system and user are backed up and restored successfully thereby protecting all the registry application data.

In an embodiment, protection of all registry application data is achieved using a hybrid approach involving a combination of the VSS method and the Win32 API method to conduct the backup and restore of the registry.

In this embodiment, the VSS method is employed to perform the backup of the registry. The registry writer reports only the system hives for the backup. To include the user hives, a technique includes enumerating the registry using Win32 API's, collecting the user hives, adding those hives to the list provided by the registry writer, and backing up all the files related to the system and the user hives from the VSS shadow copy volume under the registry writer backup.

Figure 24:
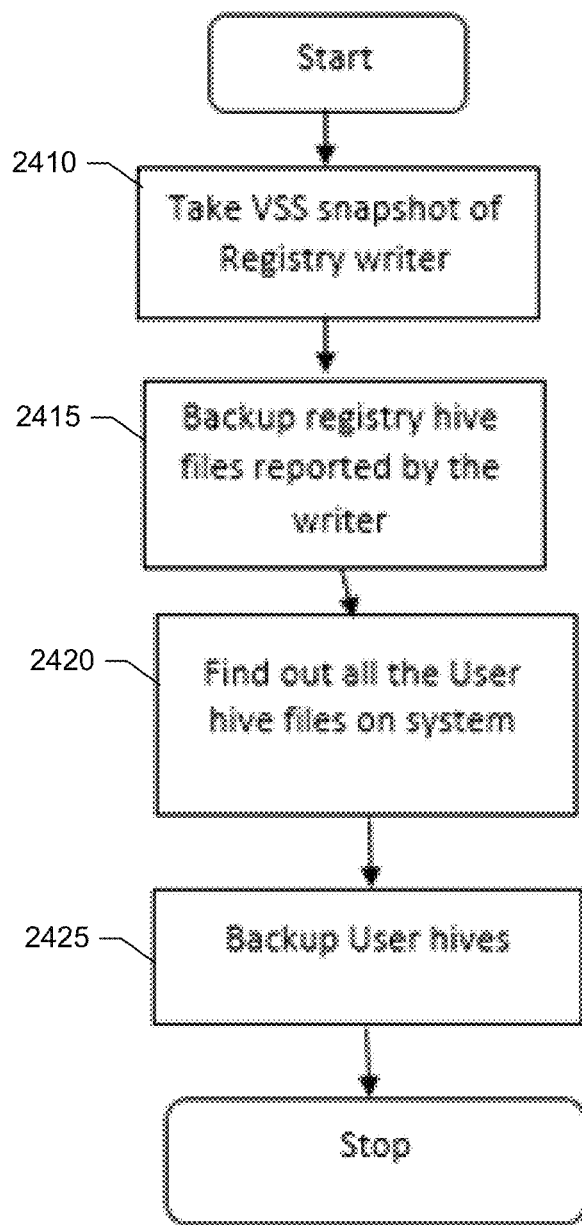
FIG. 24 shows a flow for backing up a registry, according to one or more embodiments.

FIG. 24 shows a flow of a hybrid technique for conducting a system state recovery (SSR) backup up of a registry on a host. In a step 2410, a VSS snapshot is taken of the registry writer. In a step 2415, registry hive files reported by the registry writer are backed up. In a step 2420, all user hive files on the host system are found. In a step 2425, the user hive files are backed up.

In this embodiment, during restore, the files backed up under registry writer are queried. This list of files is filtered with the current hive list. The current hive list is obtained using the Win32 registry API. Any user hive that is not currently in the registry is filtered out. The remaining user hives along with the system hives are restored using the VSS method. The hive files from the backup are restored to a temporary directory. The operating system is then informed or notified to replace these files to the original location after reboot using the "PendingFileRenameOperations" operations registry key.

This hybrid approach employing the VSS and the registry API restores both the system hives and all the valid user hives. This hybrid method of restore addresses the issue of not restoring the user hives with the VSS method and fixes the issue of some system hives not being restored on Windows 2016 onwards when using the Win32 Registry API.

Figure 25:
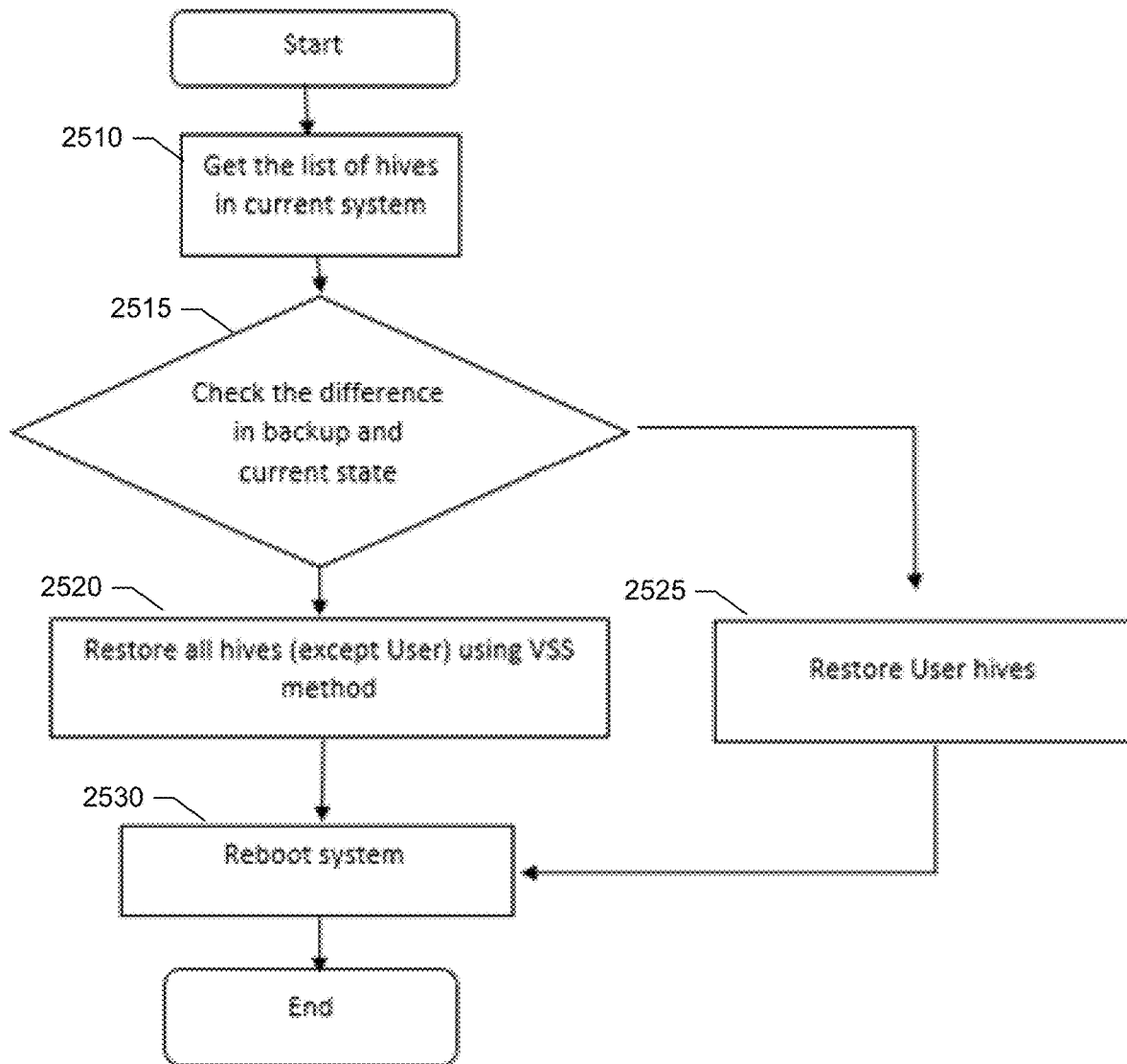
FIG. 25 shows a flow for restoring the registry, according to one or more embodiments.

For example, FIG. 25 shows a flow of the hybrid technique for conducting a restore of the registry to the host system, the host now being a target host system. In a step 2510, a list of hives in the current target system to be restored is obtained. In a step 2515, a check is performed of the difference in the backup copy to restore and current state. In a step 2520, all hives except the user hives are restored using the VSS method. In a step 2530, once the system and user hives have been restored, the host target system is rebooted.

Figure 26:
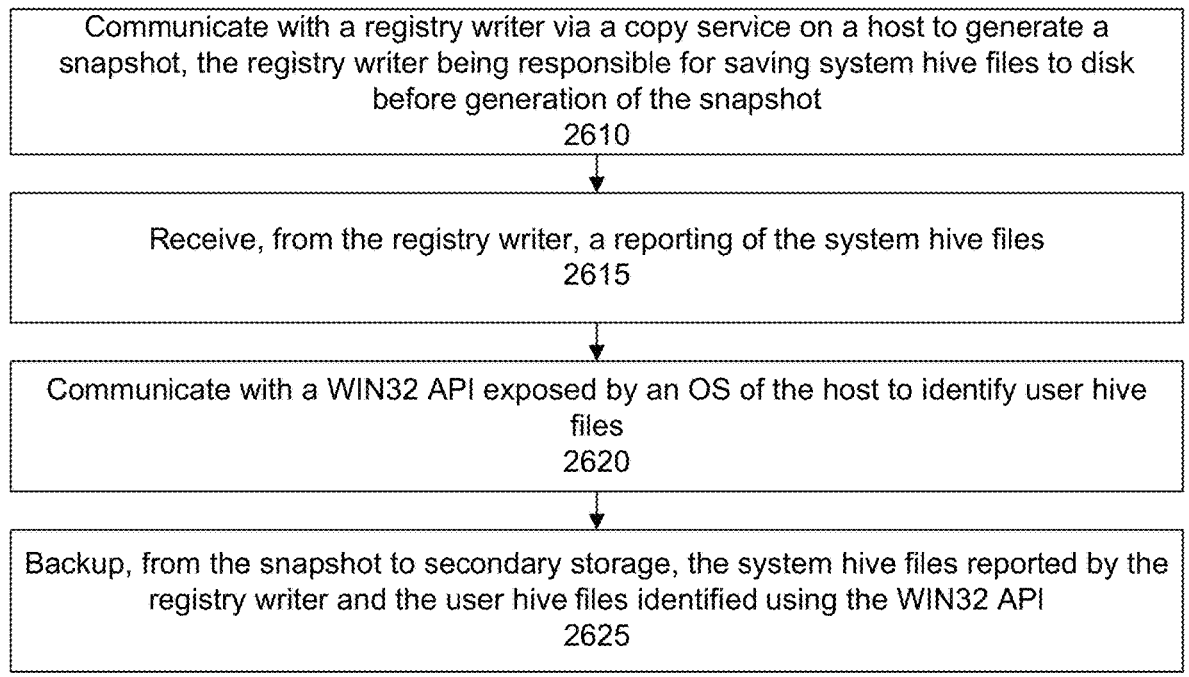
FIG. 26 shows another flow for backing up a registry, according to one or more embodiments.

FIG. 26 shows another flow of the hybrid technique for conducting an SSR backup of a registry of a host. In a step 2610, communications are exchanged with a registry writer via a copy service on the host to generate a snapshot, the registry writer being responsible for saving system hive files of the registry to disk before generation of the snapshot. In particular, the registry writer may be instructed, via the copy service, to prepare for generation of the snapshot.

In a step 2615, a reporting or listing of the system hive files are received from the registry writer.

In a step 2620, communications are exchanged with an application programming interface (API) exposed by an operating system of the host. In an embodiment, the API is the Windows or Win32 API.

In a step 2625, a backup, from the snapshot to secondary storage, is conducted of the system hive files reported by the registry writer and the user hive files identified using the Win32 API.

Figure 27:
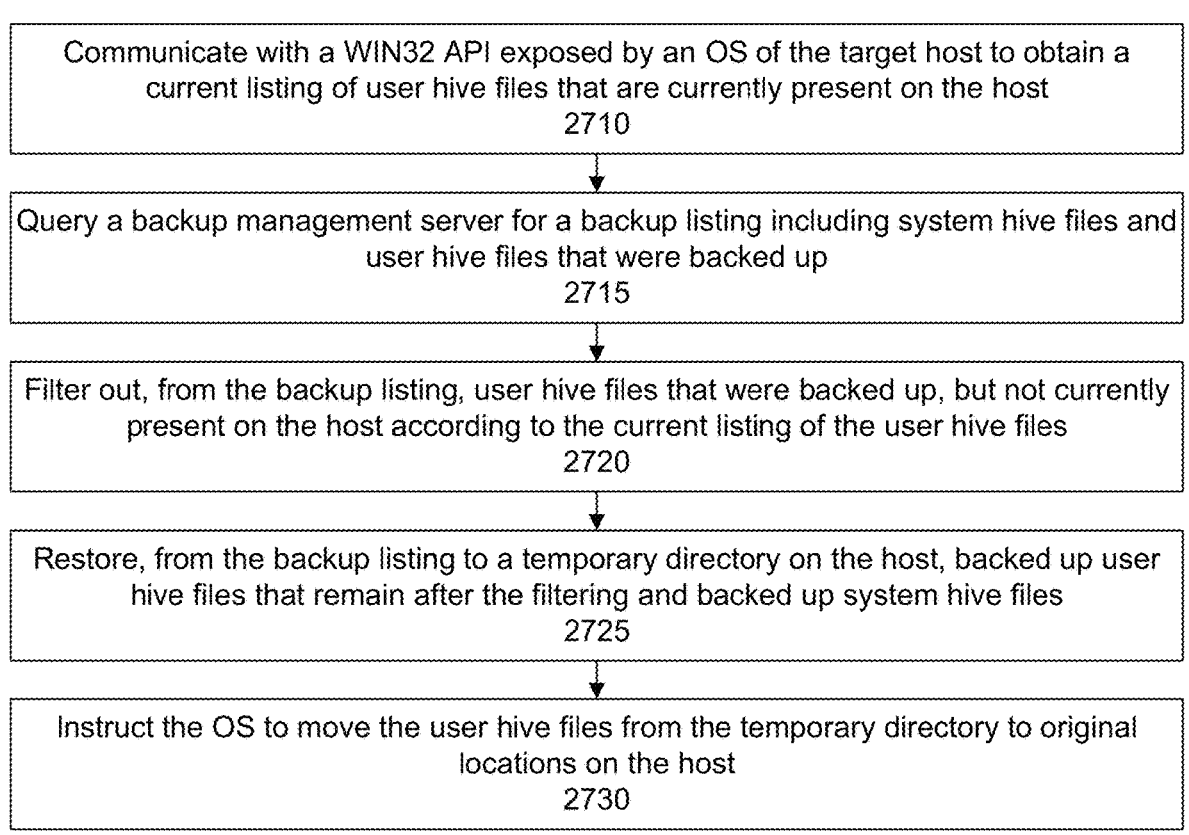
FIG. 27 shows another flow for restoring the registry, according to one or more embodiments.

FIG. 27 shows another flow of the hybrid technique for restoring the SSR backup of the registry to the host or target host. In a step 2710, upon a request to perform the restore, communications are exchanged with an API exposed by an operating system of the target host to obtain a listing of user hive files that are currently present on the target host. In an embodiment, the API is the Win32 API.

In a step 2715, a backup management server is queried for a backup listing, associated with a backup copy to be restored to the target host, that includes system hive files and user hive files that were backed up.

In a step 2720, user hive files that were backed up, but not currently present on the target host according to the current listing of user hive files are filtered out. As discussed, a host in a large enterprise can have multiple users. Filtering out backed up user hives of users not currently present on the host helps to avoid restoring user settings and other associated configuration for users not currently present on the host. These backed up user hives that are not applicable based on the current state of the host are filtered out. In an embodiment, these hives are identified and filtered out by matching them with the current hive list in the registry. That is, during a restoration of the registry, user hive files that were backed up, but no longer applicable are identified and not restored.

In a step 2725, a restoration to a temporary directory on the target host is performed of backed up user hive files that remain after the filtering and backed up system hive files.

In a step 2730, the operating system on the target host is instructed to move the user hive files out from the temporary directory and to their operating or original locations on the target host. Thus, upon reboot, user settings and other associated configuration for users currently present on the host are restored.

Figure 28:
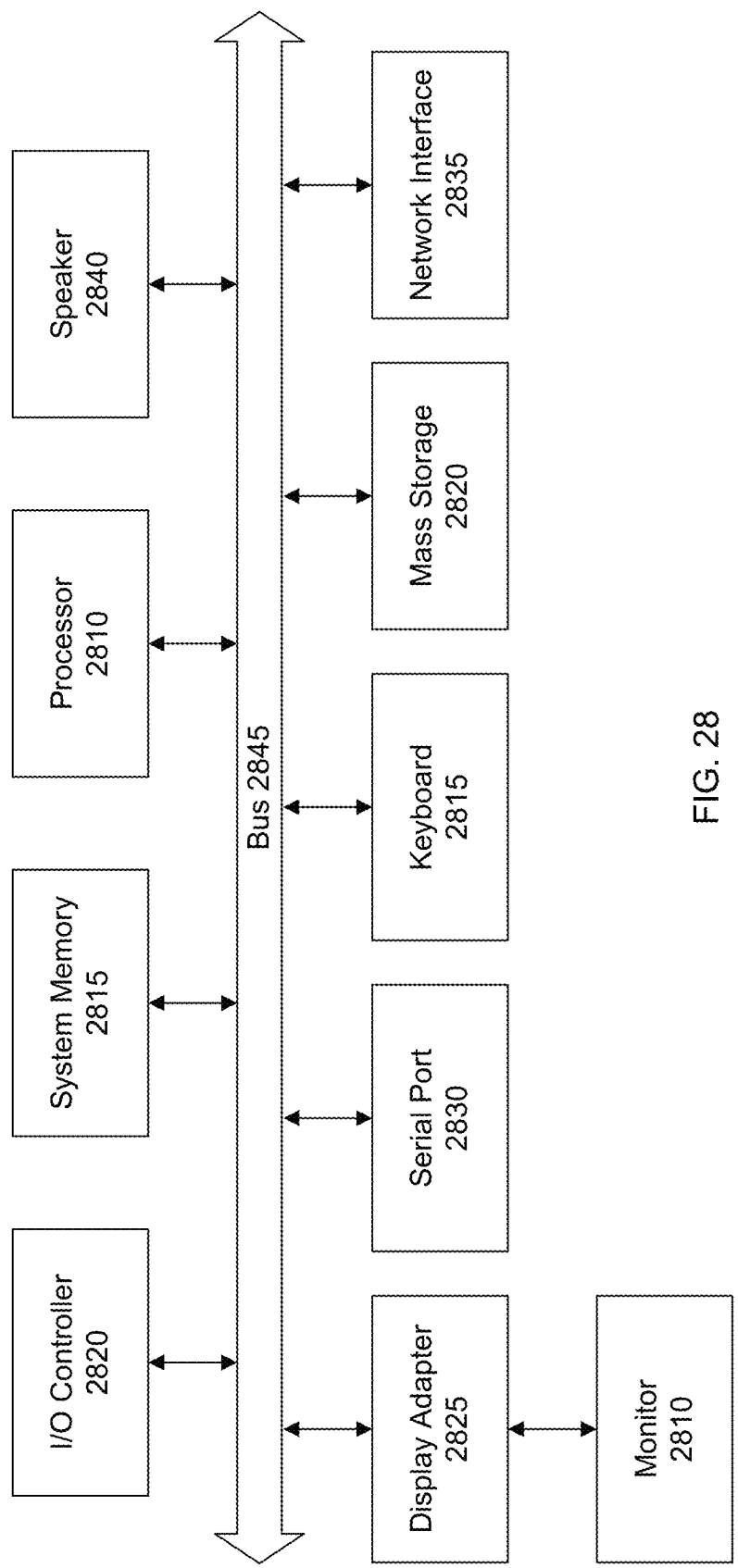
FIG. 28 shows a block diagram of a computer system that may be used to execute code and processes of the system, according to one or more embodiments.

FIG. 28 shows a system block diagram of a computer system used to execute the software of the present system described herein. The computer system 2805 includes a monitor 2810, keyboard 2815, and mass storage devices 2820. Computer system 2805 further includes subsystems such as central processor 2810, system memory 2815, input/output (I/O) controller 2820, display adapter 2825, serial or universal serial bus (USB) port 2830, network interface 2835, and speaker 2840. The system may also be used with computer systems with additional or fewer subsystems. For example, a computer system could include more than one processor 2810 (i.e., a multiprocessor system) or a system may include a cache memory.

Arrows such as 2845 represent the system bus architecture of computer system 2805. However, these arrows are illustrative of any interconnection scheme serving to link the subsystems. For example, speaker 2840 could be connected to the other subsystems through a port or have an internal direct connection to central processor 2810. The processor may include multiple processors or a multicore processor, which may permit parallel processing of information. Computer system 2805 shown in FIG. 28 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, there is a method of conducting a bare metal recovery or system state recovery (BMR/SSR) backup comprising: communicating with a copy service to identify writers associated with the copy service, the writers being system writers that participate in a BMR/SSR backup; generating a mapping between the writers and files associated with the writers, the mapping comprising file properties of the files; initializing the mapping by tagging the writers with a full backup tag; creating a base backup copy of the writers by conducting a full backup of each writer tagged with the full backup tag; upon a BMR/SSR backup operation after creating the base backup copy, generating a list of current files that will participate in the BMR/SSR backup operation; comparing the list of current files against the files in the mapping to determine whether a particular writer associated with a current file should be tagged with the full backup tag or an incremental backup tag; tagging the particular writer with the incremental backup tag when file properties associated with the current file have changed; and tagging the particular writer with the full backup tag when file properties associated with the current file have not changed or the current file is not present in the mapping.

In an embodiment, there is a method of conducting a system object backup comprising: communicating with a copy service to identify writers associated with the copy service, the writers being system writers that are to participate in a backup; generating a mapping between the writers and files associated with the writers, the mapping comprising file properties of the files; initializing the mapping by tagging the writers with a full backup tag; creating a base backup copy of the writers by conducting a full backup of each writer tagged with the full backup tag; upon a current backup operation after creating the base backup copy, generating a list of current files that will participate in the current backup operation; comparing the list of current files against the files in the mapping to determine whether a particular writer associated with a current file should be tagged with the full backup tag or an incremental backup tag; tagging the particular writer with the incremental backup tag when file properties associated with the current file have changed; and tagging the particular writer with the full backup tag when file properties associated with the current file have not changed or the current file is not present in the mapping.

The tagging the particular writer with the incremental backup tag when file properties associated with the current file have changed may include: adding the current file to a list of files to be backed up during the current backup operation; and not adding other files associated with the particular writer according to the mapping to the list of files to be backed up during the current backup operation, the other files not being in the list of current files that will participate in the current backup operation.

The tagging the particular writer with the full backup tag when file properties associated with the current file have not changed may include: adding the current file to the list of files to be backed up during the current backup operation; and adding each other file associated with the particular writer according to the mapping to the list of files to be backed up during the current backup operation.

In an embodiment, the current file and the particular writer are not present in the mapping, the current file being a new file and the particular writer being a new writer. In an embodiment, the current file is not present in the mapping and the particular writer is present in the mapping. In an embodiment, the copy service includes a volume shadow copy service (VSS).

In an embodiment, there is a method of conducting a backup of a host having a copy service supporting a bare metal recovery (BMR) and a system state recovery (SSR), the backup being one of a BMR backup or a SSR backup, the method comprising: generating a data structure to store information about a plurality of writers associated with the copy service; communicating with the copy service to gather the information, the information comprising names of the writers, writer types as being one of system or application writers, and system writer subtypes as being one of BMR or SSR writers; populating the data structure with the information; reviewing the data structure to determine whether a particular writer should participate in the backup; based on the review, generating a list comprising a subset of the plurality of writers, the list including writers that should participate in the backup and excluding other writers that should not participate in the backup; instructing, via the copy service, the writers in the list to prepare for creation of a snapshot; and upon creation of the snapshot, backing up data from the snapshot to secondary storage.

The method may include excluding the application writers from the list. In an embodiment, the backup comprises an SSR backup and the method further comprises: identifying a type of the particular writer as being a system writer; identifying a system writer subtype of the particular writer as being a BMR writer; and excluding the particular writer from the list.

In an embodiment, the backup comprises a BMR backup and the method further comprises: identifying a type of the particular writer as being a system writer; identifying a system writer subtype of the particular writer as being a BMR writer; and including the particular writer in the list.

In an embodiment, the method further includes: determining whether the copy service returns a property of a writer as being "VSS_UT_BOOTABLESYSTEMSTATE," "VSS_UT_SYSTEMSERVICE," or "VSS_UT_USERDATA"; when the property of the writer is "VSS_UT_BOOTABLESYSTEMSTATE" or "VSS_UT_SYSTEMSERVICE," identifying the writer as being a system writer; and when the property of the writer is "VSS_UT_USERDATA," identifying the writer as being an application writer.

In an embodiment, there is a method of conducting a bare metal restore (BMR) of a target host comprising: booting the target host into a preinstallation environment; issuing, from a representational state transfer (REST) application programming interface (API) of the target host, a request to a backup management server to register as a recovery agent; receiving, from the backup management server, a transport layer security (TLS) certificate to establish a secure channel with the backup management server; issuing, from the REST API of the target host and over the secure channel, a request identifying a backup copy to be restored on the target host; receiving, at the target host, credentials required to access a backup storage at which the backup copy is stored; and using the credentials, retrieving the backup copy from the backup storage for restoration at the target host.

In an embodiment, the method further includes: during restoration of the backup copy at the target host, receiving, through the REST API, periodic requests for progress updates concerning the restoration of the target host; and responding to the periodic requests for the progress updates, wherein the backup management server displays a restore completion percentage on a user interface of the backup management server based on the progress updates.

In an embodiment, the preinstallation environment comprises a Microsoft Windows Preinstallation Environment (WinPE). The method may include: hosting an HTTP server at the target host exposing API endpoints for the REST API. In an embodiment, the target host is a bare metal computer without an operating system or application programs. Booting the target host into a preinstallation environment may include: booting the target host from an ISO image.

In an embodiment, a method includes: collecting, with each bare metal recovery (BMR) backup copy of a host, network configuration details associated with the host; storing, in a backup storage, the network configuration details with each BMR backup copy; booting a target host into a preinstallation environment; configuring the target host into a Dynamic Host Configuration Protocol (DHCP) mode to allow the target host to establish a network connection to a backup management server; receiving, from a user, details about the host; retrieving, via the network connection to the backup management server, a listing of BMR backup copies corresponding to the host details; receiving, from the user, a selection of a BMR backup copy to be restored onto the target host; downloading, from the backup storage, network configuration details corresponding to the selected BMR backup copy; and populating a recovery wizard at the target host with the network configuration details.

In an embodiment, the target host comprises a bare metal machine without an operating system or application programs. The network configuration details associated with the host may include a hostname, domain name system (DNS) name, and internet protocol (IP) configuration type as being one of static or dynamic. The method may include: allowing the user to edit the network configuration details populated by the recovery wizard.

In an embodiment, the recovery wizard is bundled as a Java application with an ISO image having the preinstallation environment. In an embodiment, the preinstallation environment is a Microsoft Windows Preinstallation Environment (WinPE).

In an embodiment, a method includes: identifying writers that are present on a host, the writers being associated with a copy service on the host and the identification comprising names of the writers, and writer types as being one of system or application writers; for each writer identified as a system writer, calculating a size of the system writer and checking whether a volume associated with the system writer comprises system data; when the volume comprises system data, marking the volume as a critical volume and obtaining a size of the critical volume; and maintaining a tally summing the sizes of the system writer and critical volume.

The method may further include: passing the tally to a backup management server. The method may further include: identifying a writer as a system writer when an attribute associated with the writer has a value of "VSS_UT_BOOTABLESYSTEMSTATE" or "VSS_UT_SYSTEMSERVICE." The calculating a size of the system writer may further include: identifying files enumerated by the system writer; obtaining sizes of the files; and adding the sizes of the files to the tally. In an embodiment, the tally is reported as a front end terabyte (FETB) value indicating an amount of data that is protected for a bare metal recovery (BMR) or system state recovery (SSR) operation.

In an embodiment, there is a method comprising: communicating with a copy service of a host to identify writers associated with the copy service, the identification comprising a type of a writer as being one of a system writer or an application writer; adding writers identified as system writers to a list of writers that should participate in a backup operation; for writers identified as application writers, iterating through each component of an application writer to determine whether a component of the application writer has a name or logical path that includes a name of a system service; when any component of the application writer has the name or logical path that includes the name of the system service, promoting the application writer to be of type system writer by adding the application writer to the list of writers that should participate in the backup operation; and backing up components of each writer listed in the list of writers.

In an embodiment, the promoting the application writer to be of type system writer further comprises: adding, to a backup list, a component owned by the application writer having the name or logical path that includes the name of the system service; and not adding, to the backup list, a component owned by the application writer not having the name or logical path that includes the name of the system service.

In an embodiment, the method further includes identifying writers having an attribute of VSS_USAGE_TYPE set to VSS_UT_USERDATA as being application writers. In an embodiment, the method further includes identifying writers having an attribute of VSS_USAGE_TYPE set to VSS_UT_BOOTABLESYSTEMSTATE or VSS_UT_SYSTEMSERVICE as being system writers. The method may include adding, to a backup list, all components owned by a writer identified as a system writer.

In an embodiment, there is a method of protecting a registry of a host, the registry comprising system hive files and user hive files, the method comprising: instructing a registry writer via a copy service on the host to prepare for generation of a snapshot, the registry writer being responsible for saving the system hive files to disk before the snapshot is generated; receiving, from the registry writer, a reporting of the system hive files; communicating with an application programming interface (API) exposed by an operating system of the host to identify the user hive files; and backing up, from the snapshot to a secondary storage, the system hive files reported by the registry writer and the user hive files identified using the API exposed by the operating system.

The method may further include: upon a request to restore the registry, communicating with the API exposed by the operating system of the host to obtain a current listing comprising user hive files that are currently present on the host; querying a backup management server for a backup listing comprising the system hive files and the user hive files that were backed up; filtering out, from the backup listing, backed up user hive files that are not currently present on the host according to the current listing of the user hive files; restoring, from the backup listing to a temporary directory on the host, backed up user hive files that remain after the filtering and backed up system hive files; and instructing the operating system to move the user hive files and system hive files out of the temporary directory.

In an embodiment, the application programming interface comprises a Win32 API. In an embodiment, the registry writer does not report the user hive files. The method may further include during a restoration of the registry to the host, identifying user hive files that were backed up, but no longer applicable for restoration; and not restoring the user hive files no longer applicable for restoration.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of protecting a registry of a host, the registry comprising system hive files and user hive files, the method comprising:
   instructing a registry writer via a copy service on the host to prepare for generation of a snapshot, the registry writer being responsible for saving the system hive files to disk before the snapshot is generated;
   generating the snapshot;
   receiving, from the registry writer, a reporting of the system hive files;
   communicating with an application programming interface (API) exposed by an operating system of the host to identify the user hive files; and
   backing up, from the snapshot to a secondary storage, the system hive files reported by the registry writer and the user hive files identified using the API exposed by the operating system.

2. The method of claim 1 further comprising:
   upon a request to restore the registry, communicating with the API exposed by the operating system of the host to obtain a current listing comprising user hive files that are currently present on the host;
   querying a backup management server for a backup listing comprising the system hive files and the user hive files that were backed up;
   filtering out, from the backup listing, backed up user hive files that are not currently present on the host according to the current listing of the user hive files;
   restoring, from the backup listing to a temporary directory on the host, backed up user hive files that remain after the filtering and backed up system hive files; and
   instructing the operating system to move the user hive files and system hive files out of the temporary directory.

3. The method of claim 1 wherein the application programming interface comprises a Win32 API.

4. The method of claim 1 wherein the copy service comprises a volume shadow copy service (VSS).

5. The method of claim 1 wherein the registry writer does not report the user hive files.

6. The method of claim 1 further comprising:

during a restoration of the registry to the host, identifying user hive files that were backed up, but no longer applicable for restoration; and not restoring the user hive files no longer applicable for restoration.

7. A system comprising: a processor; and memory configured to store one or more sequences of instructions which, when executed by the processor, cause the processor to carry out the steps of:

instructing a registry writer via a copy service on the host to prepare for generation of a snapshot, the registry writer being responsible for saving system hive files to disk before the snapshot is generated;

generating the snapshot;

receiving, from the registry writer, a reporting of the system hive files;

communicating with an application programming interface (API) exposed by an operating system of the host to identify user hive files; and backing up, from the snapshot to a secondary storage, the system hive files reported by the registry writer and the user hive files identified using the API exposed by the operating system.

8. The system of claim 7 wherein the processor further carries out the steps of:

upon a request to restore the registry, communicating with the API exposed by the operating system of the host to obtain a current listing comprising user hive files that are currently present on the host;

querying a backup management server for a backup listing comprising the system hive files and the user hive files that were backed up;

filtering out, from the backup listing, backed up user hive files that are not currently present on the host according to the current listing of the user hive files;

restoring, from the backup listing to a temporary directory on the host, backed up user hive files that remain after the filtering and backed up system hive files; and instructing the operating system to move the user hive files and system hive files out of the temporary directory.

9. The system of claim 7 wherein the application programming interface comprises a Win32 API.

10. The system of claim 7 wherein the copy service comprises a volume shadow copy service (VSS).

11. The system of claim 7 wherein the registry writer does not report the user hive files.

12. The system of claim 7 wherein the processor further carries out the steps of:

during a restoration of the registry to the host, identifying user hive files that were backed up, but no longer applicable for restoration; and not restoring the user hive files no longer applicable for restoration.

13. A computer program product, comprising a non-transitory computer-readable medium having a computer-readable program code embodied therein, the computer-readable program code adapted to be executed by one or more processors to implement a method comprising:

instructing a registry writer via a copy service on the host to prepare for generation of a snapshot, the registry writer being responsible for saving system hive files to disk before the snapshot is generated;

generating the snapshot;

receiving, from the registry writer, a reporting of the system hive files;

communicating with an application programming interface (API) exposed by an operating system of the host to identify user hive files; and backing up, from the snapshot to a secondary storage, the system hive files reported by the registry writer and the user hive files identified using the API exposed by the operating system.

14. The computer program product of claim 13 wherein the method further comprises:

upon a request to restore the registry, communicating with the API exposed by the operating system of the host to obtain a current listing comprising user hive files that are currently present on the host;

querying a backup management server for a backup listing comprising the system hive files and the user hive files that were backed up;

filtering out, from the backup listing, backed up user hive files that are not currently present on the host according to the current listing of the user hive files;

restoring, from the backup listing to a temporary directory on the host, backed up user hive files that remain after the filtering and backed up system hive files; and instructing the operating system to move the user hive files and system hive files out of the temporary directory.

15. The computer program product of claim 13 wherein the application programming interface comprises a Win32 API.

16. The computer program product of claim 13 wherein the copy service comprises a volume shadow copy service (VSS).

17. The computer program product of claim 13 wherein the registry writer does not report the user hive files.

18. The computer program product of claim 13 wherein the method further comprises:

during a restoration of the registry to the host, identifying user hive files that were backed up, but no longer applicable for restoration; and not restoring the user hive files no longer applicable for restoration.

* * * * *